Figure 1:
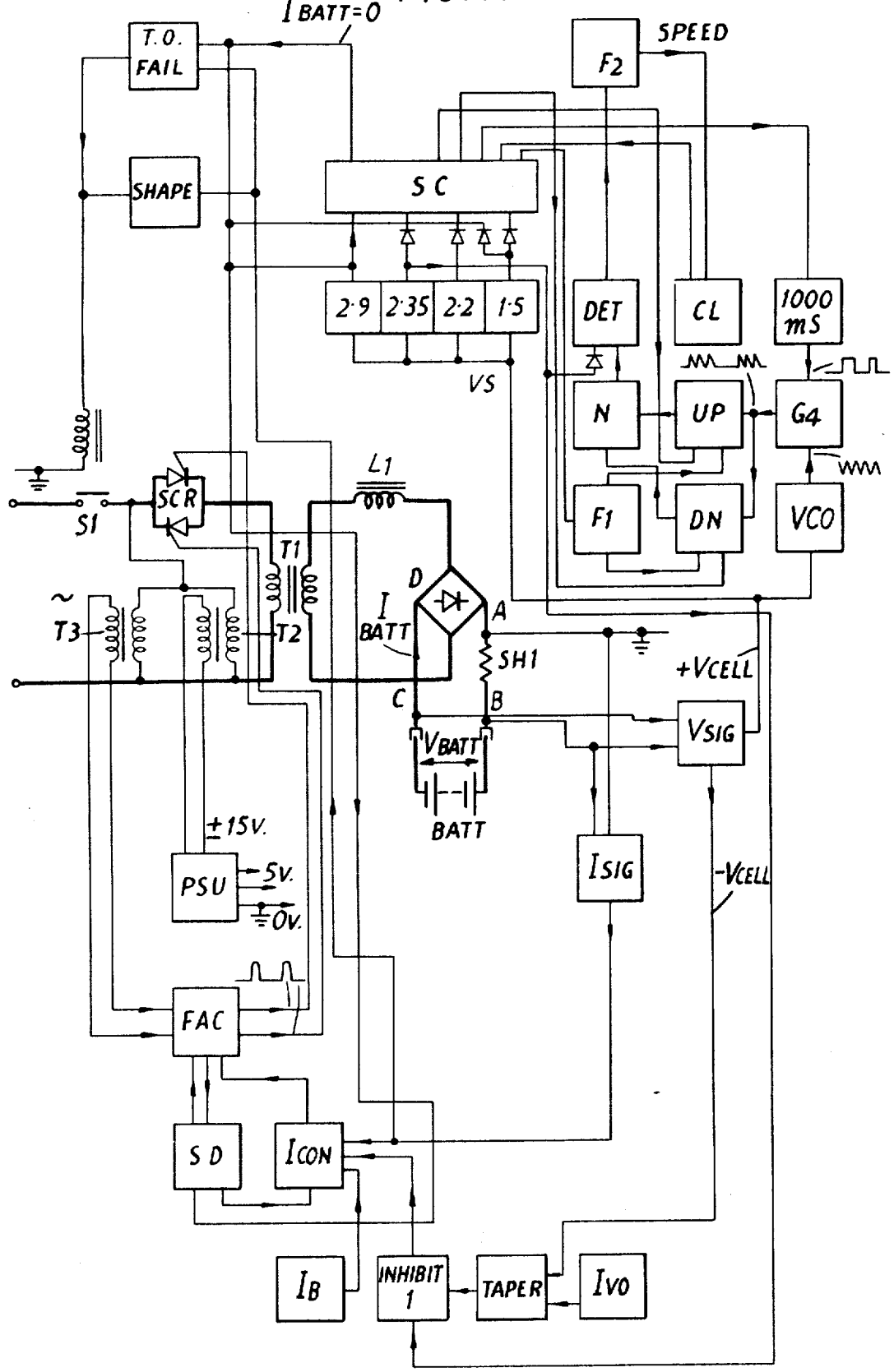

United States Patent [19]
Melling et al.

[11] 3,890,556
[45] June 17, 1975

[54] BATTERY CHARGERS

[75] Inventors: William Gordon Melling; John Stevens; Peter George McLellan; Brian Turton Smith; Richard Gascoine Massey; John Barrington Knight; Robert Nigel Lang, all of London, England

[73] Assignee: Westinghouse Brake & Signal Co. Ltd., London, England

[22] Filed: Sept. 24, 1973

[21] Appl. No.: 400,001

[30] Foreign Application Priority Data
Oct. 14, 1972 United Kingdom............... 47491/72
Nov. 11, 1972 United Kingdom............... 52200/72
Apr. 24, 1973 United Kingdom............... 19464/73

[52] U.S. Cl. ...................... 320/21; 320/30; 320/39; 320/43
[51] Int. Cl. ............................................. H02j 7/04
[58] Field of Search ............ 320/30, 31, 39, 40, 43, 320/14, 20, 21

[56] References Cited
UNITED STATES PATENTS
| | | | |
|---|---|---|---|
| 3,424,969 | 1/1969 | Barry | 320/30 X |
| 3,590,358 | 6/1971 | Ruben | 320/39 |
| 3,621,359 | 11/1971 | Schnegg | 320/43 |
| 3,660,748 | 5/1972 | Clayton | 320/43 X |
| 3,700,997 | 10/1972 | Smith | 320/14 |
| 3,761,795 | 9/1973 | Clayton | 320/39 X |
| 3,794,905 | 2/1974 | Long | 320/39 X |

*Primary Examiner*—J. D. Miller
*Assistant Examiner*—Robert J. Hickey
*Attorney, Agent, or Firm*—Larson, Taylor & Hinds

[57] ABSTRACT

A battery charger control system is proposed in which the state of charge of a battery on a charger is assessed by an arrangement which intermittently interrupts the charge which is provided by the charger and during an interruption times a period at the end of which the battery voltage is sensed. Means is provided to then compare the sensed battery voltage which has been sensed earlier in an interruption of the charging current, with a logic circuit arrangement responsive to the result of the comparison for permitting, preventing or modifying the charging current after the interruption.

17 Claims, 12 Drawing Figures

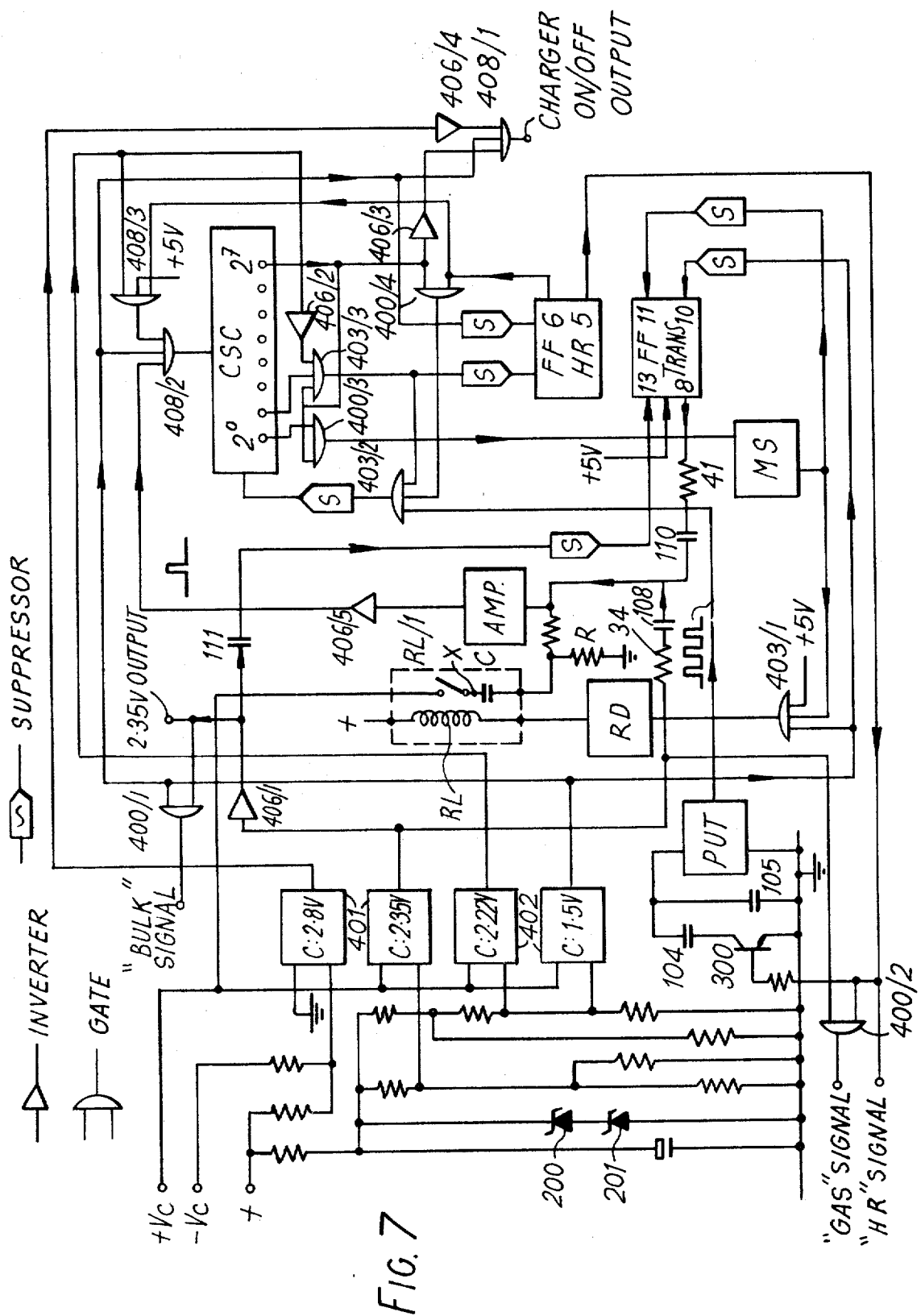

3,890,556

BATTERY CHARGERS

This invention relates to battery chargers.

According to the invention there is provided a battery charging control circuit in which the state of battery charge is assessed by measurement when the battery charging current is interrupted and including means operative during an interruption to time a period of time, means responsive to the end of said period to register the battery voltage, means to compare the registered battery voltage with the battery voltage registered earlier during an interruption of charging current and means responsive to the result of said comparison to permit, prevent or modify the charging current thereafter applied to the connected battery.

The battery voltage may be registered by an analogue or a digital method. The analogue registration may be performed by charging a capacitor. The digital registration may be performed by controlling the frequency of a voltage controlled oscillator, the number or frequency of said oscillations being recorded. The earlier registered battery voltage may be registered during the same interruption as the later registered battery voltage or during another, earlier, interruption of charging current.

The interruption may be formed between successive ones of a series of pulses and the battery voltage may registered at the beginning and end of an interval beginning at the end of said period of time as a measurement of a change in voltage.

The pulses of the series may be of equal duration and equally spaced in time. The magnitude of the current flowing during succeeding pulses may be varied according to a predetermined law.

The intervals over which the change of battery voltage is measured may all be equal and equally spaced in time after the end of a respective pulse of the series. In this case the change measured in two intervals may be compared.

The change in an interval may be measured by applying the battery voltage at the beginning and the end of the interval to a voltage controlled oscillator and comparing the resultant frequencies. The frequencies may be compared by counting a counter in opposite directions for the same period with each frequency, resultant count indicating the change in voltage. By repeating the count for one of said equal and equally spaced subsequent intervals and combining the counts in the counter the difference between the change in each said interval may be assessed.

The charger may include means responsive to said difference between the change in each said interval achieving a selected value to prevent the continuation of said series of pulses.

The sequence of pulses and intervals may be timed by a sequence controlled including a counter arranged to count a first count from an origin to represent the length of one of said pulses, a second count additional to the first at the end of which the interval starts, and a third count additional to the second to represent said interval. The controller may be responsive to the first count to prevent the flow of charging current and to a fourth count additional to the third to permit the flow of charging current again. The counter may count a fifth count intermediate said third and fourth at which the menas responsive to the change in battery voltage is operative to permit or prevent charging current to flow again at the fourth count.

When the change in battery voltage in subsequent intervals is compared the fifth count in the first of two subsequent intervals may be suppressed.

According to the invention there is also provided a battery charger for connection to an a.c. supply including a rectifier and a choke and a semiconductor controlled rectifier in a charging current path and means to vary the firing angle of the SCR to control the current in said path.

The means to vary the firing angle may be responsive to a current controller operative to adjust the charging current ($I$) to agree with a reference value. The reference value may be a constant or a quantity varied according to a predetermined law. The law may be a function of the battery voltage at the time ($V$) so that $I=(b-V)/C$ where $b$ and $C$ are constants. The law may be a stepwise approximation to this function.

The means to vary the firing angle may also be responsive to a sequence controller signal which indicates whether or not charging current is to be permitted.

The means to vary the firing angle may also be responsive to means responsive to the connection of a battery to the charger to delay the application of current to the battery for a period.

According to the invention there is also provided a battery charger in which the output current is controlled by means responsive to the magnitude of the battery voltage to generate a control signal representing an output current in accordance with a predetermined relationship and in which the charger is adapted to a relationship appropriate to a battery to be charged by modifying an electrical circuit element of said means to generate a control signal.

The means to generate a control signal may be an operational amplifier supplied with a signal representing the battery voltage to generate a signal representing the appropriate magnitude of current which signal in turn is applied to a further operational amplifier arranged to control the output current at a predetermined maximum to reduce the current below this maximum value.

According to the invention there is also provided a battery charger in which the output current is controlled by an operational amplifier whose input circuit includes circuit elements whose values are determined by a predetermined relationship between charging current ($I$) and cell voltage ($V$) of the battery to be charged.

The relationship may be of the form $I = (b-V)/c$ where $b$ is the projected value of $I$ when $V=0$ and $c$ is the ratio of $I$ to $V$, in which case the elements are resistances the value of one of which represents $b$ and the other $c$, with appropriate input signals.

The input circuit may be supplied with signals representing a maximum value of charge current an actual value of charge current and modifying signal dependent on the cell voltage.

These signals may be applied to respective resistances and the modifying signal may be provided by resistances whose values are switched at selected values of cell voltage.

The battery charger may operate in two charging stages, in the first of which a constant current of up to one third of the ampere-hour capacity is supplied until a sensor indicates that a gassing condition will have been achieved when a second stage starts in which current is supplied in pulses whose magnitude is controlled in accordance with the battery voltage at any time to prevent an excessive rate of charge, in which second stage the change in battery voltage over intervals between pulses is measured to assess the state of charge of the battery and thereby determine the end of the second stage.

The battery charger may operate in three stages, the third started after the end of second, in which the battery is charged in a further series of pulses, each shorter than these in the second stage, and the pulses are separated by periods during which the battery voltage is allowed to decay to a selected value whereupon the next pulse starts.

The period of time may be such that the registered voltages tend to a constant difference as the battery is charged or may be shorter so that the registered voltages have a difference that increases as the battery is charged. In the latter case the means responsive to the result of the comparison may reduce the charging current when the difference exceeds a selected value. This selected value may be that indicative of the occurrence of gassing in the battery. The difference may be between registered value of battery voltage fall. A further comparison may be made between the difference of the fall in voltage in similar intervals during successive interruptions. The value of the difference in said similar intervals, or a function thereof, may be applied as an input of a circuit performing an arithmetical function, another input of which circuit represents the maximum value of charging current, to modify this maximum value in accordance with the assessed state of charge.

The means may perform the assessment by comparing the value of the battery voltage with that in a previous interruption. The modification may be to reduce the charging current to zero, to terminate the charge, when the value is no more than that in said previous interruption. The comparison may be performed in an analogue difference amplifier supplied with samples of battery voltage value under the control of a sequence controller. The sequence controller may include a counter supplied with pulses by a two-speed oscillator, a faster speed controlling the duration of the interruption, the taking of the sample and the operation of the difference amplifier.

When the battery voltage is registered as an analogue it may be stored as the charge on a capacitor and the comparison of a registered voltage with an earlier registered voltage may be by sensing means responsive to energy flow to or from the storage capacitor and the charging current may be modified when the energy flow is below a chosen level.

The capacitor may be connected to the battery voltage or a voltage dependent thereon and charged therefrom for a timed interval at a selected point in the interruption. The sensing means may be an amplifier responsive to the voltage produced in a resistor through which the capacitor charging current flows.

The circuit may include a sequence controller having a counter supplied with pulses to generate timing signals to cause the interruption of the charge, the selection of the point in the interruption for the timed interval and the restarting of the charge. The interval may be timed by a separate timing element which may be mono-stable. The pulses supplied to the sequence controller may be of two rates.

The output supplied by the sensing means to modify the current may prevent the restarting of the charge by inhibiting the action of the counter and also operate a latch to change the rate at which pulses are supplied to the counter.

The circuit may also include comparators responsive to the value of the charger output voltage and respective references. A first comparator may inhibit the action of the latch until a chosen value of output voltage, and thus battery voltage, is attained. A second comparator may operate to supply an output to modify the charging current so long as the output voltage is above a chosen "gassing" value. The circuit may include means to produce a controlled transition on the said operation of the second comparator. The controlled transition means may include means to time a stabilising interval, a programmable latch which is primed by said operation of the second comparator at the start of the stabilising interval for operation at the end thereof to restart the charge, and means to charge the capacitor to said battery voltage or a voltage dependent thereon at the end of the stabilising interval to establish a corrected reference for subsequent assessments of battery charge condition.

The circuit may include a protection arrangement, brought into operation when the sensing means attempts to operate the latch while the first comparator is inhibiting its action, to interrupt the charge and cause the sequence controller to generate signals to time the interruption and thereafter restart the charge.

When the latch is operated by the action of the sensing means and the counter inhibited the first comparator may be responsive to the battery voltage falling to the chosen value to start a charge under the control of the counter supplied with pulses at the faster of the two rates to time an interval after which the charge is again stopped and the counter inhibited.

The capacitor of the assessment circuit may be connected to the battery voltage by action of a relay.

The relay may be of the reed type and the contact phial and the capacitor may be encapsulated together, connected in series, with their connected terminals completely inside the encapsulation.

Figure 2:
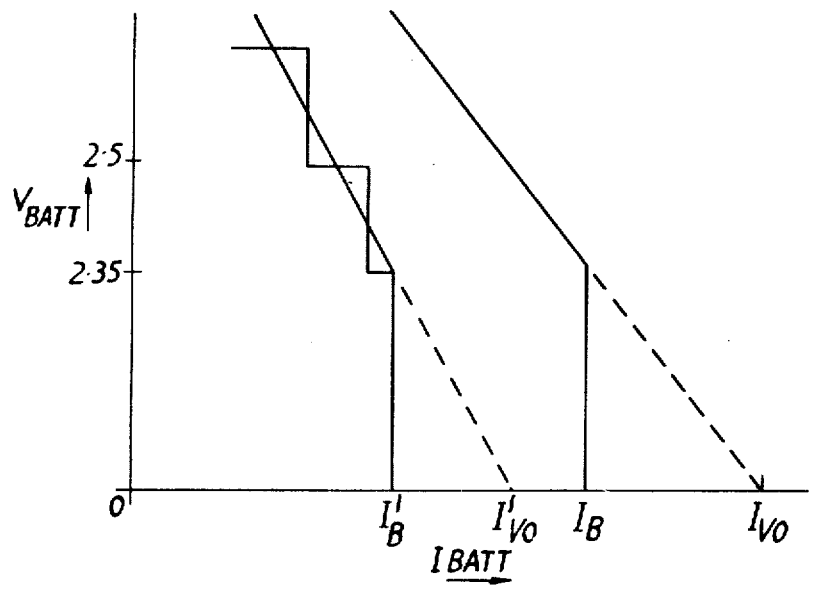
Figure 4:
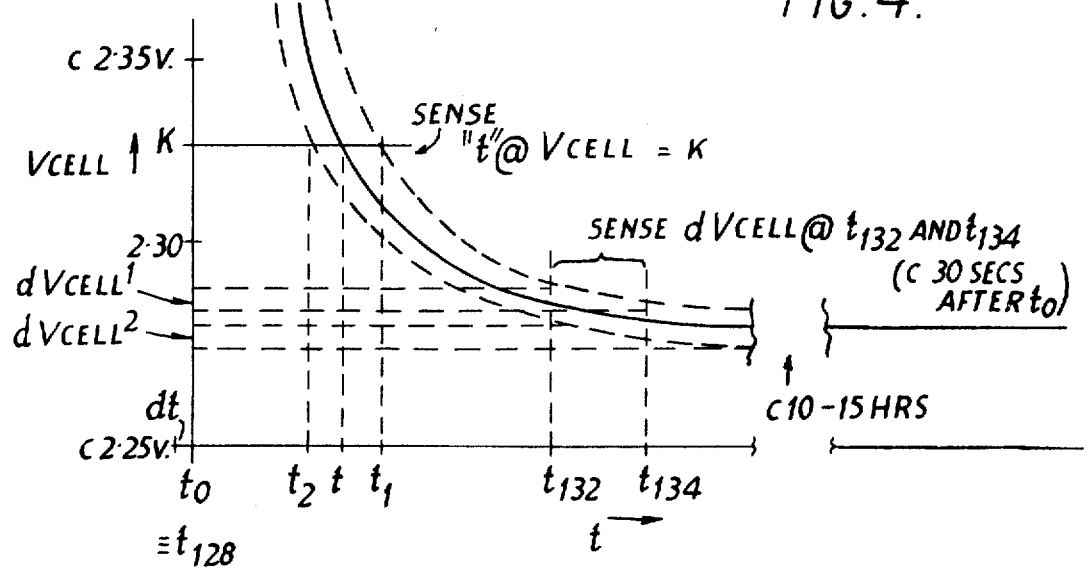
Figure 3A:
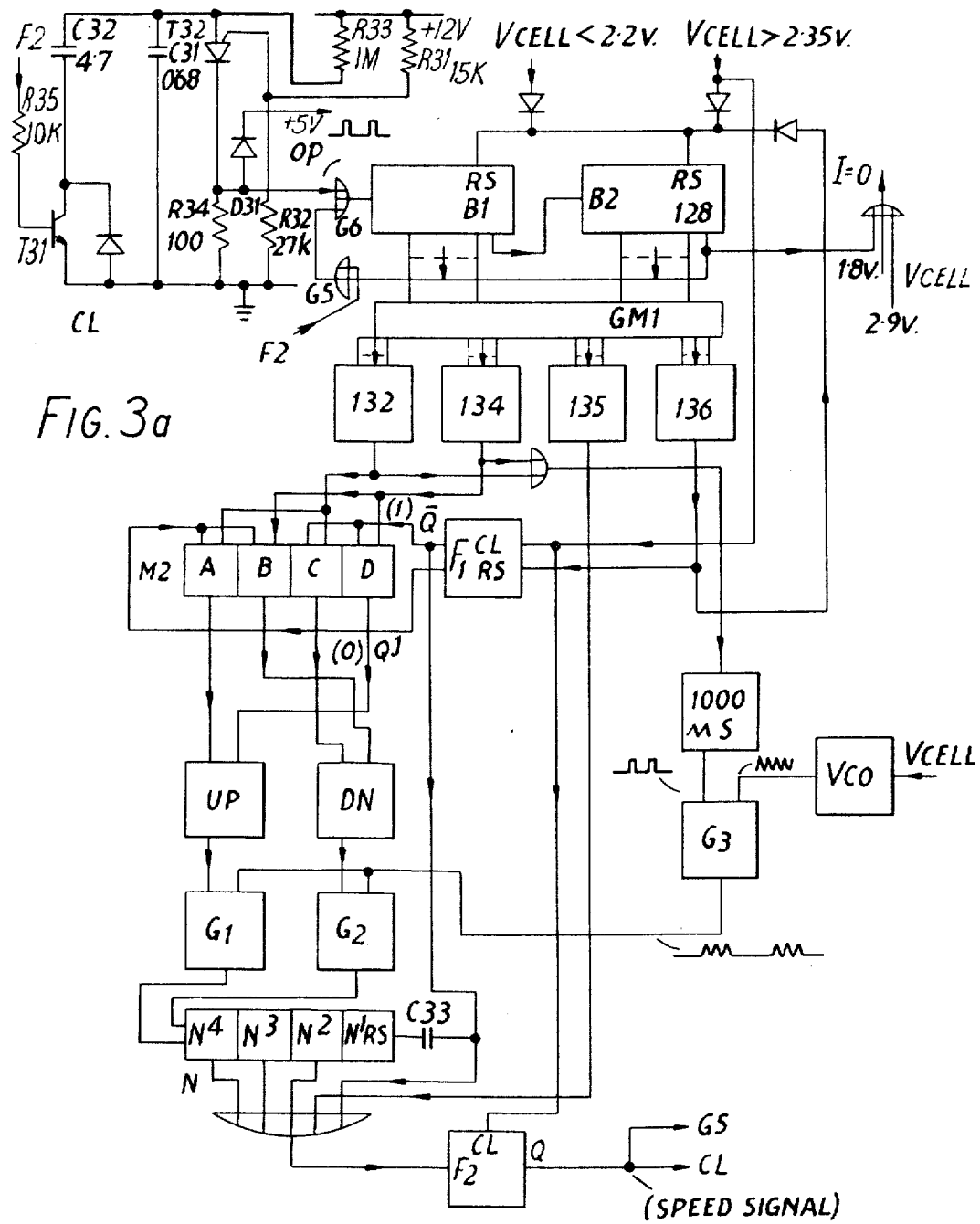
Figure 3B:
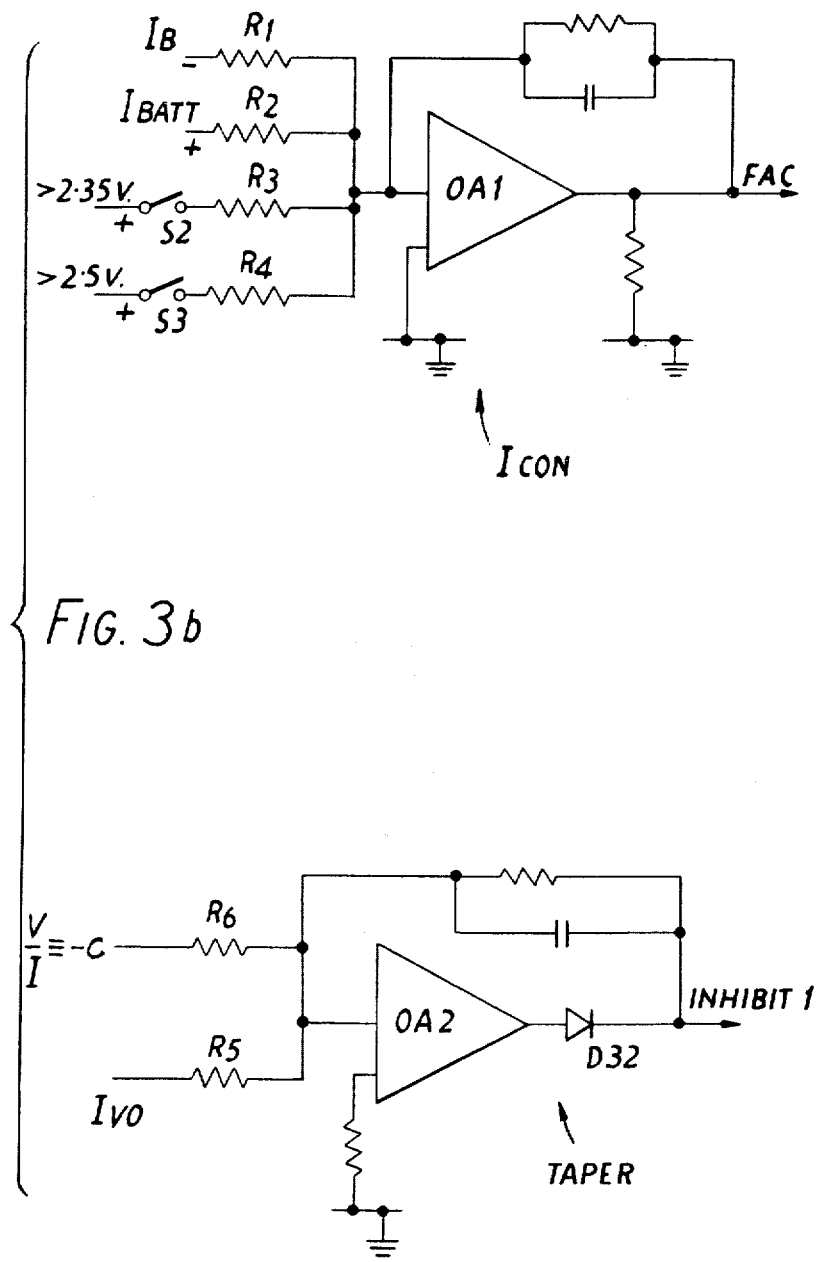
Figure 5:
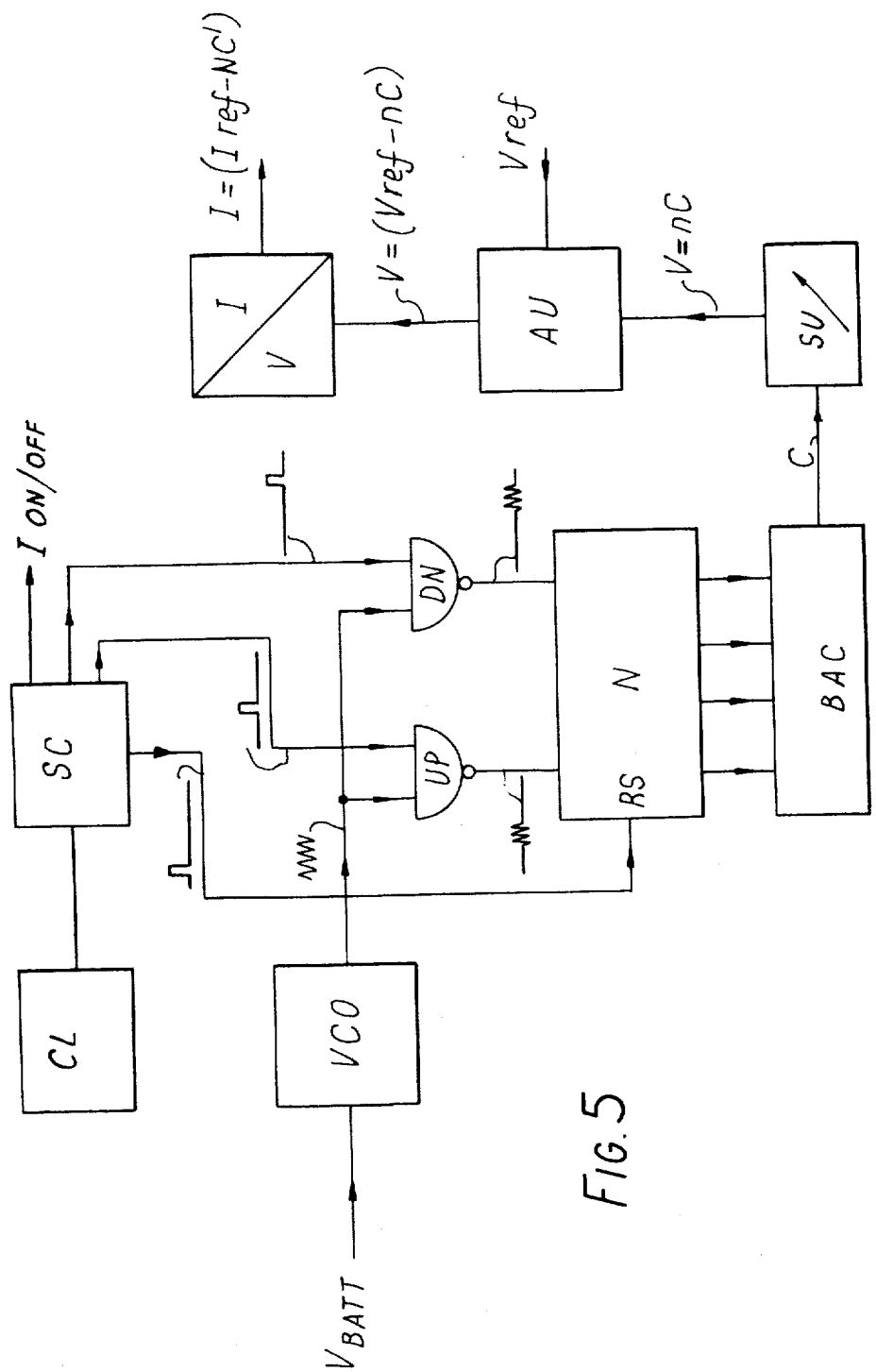
Figure 6:
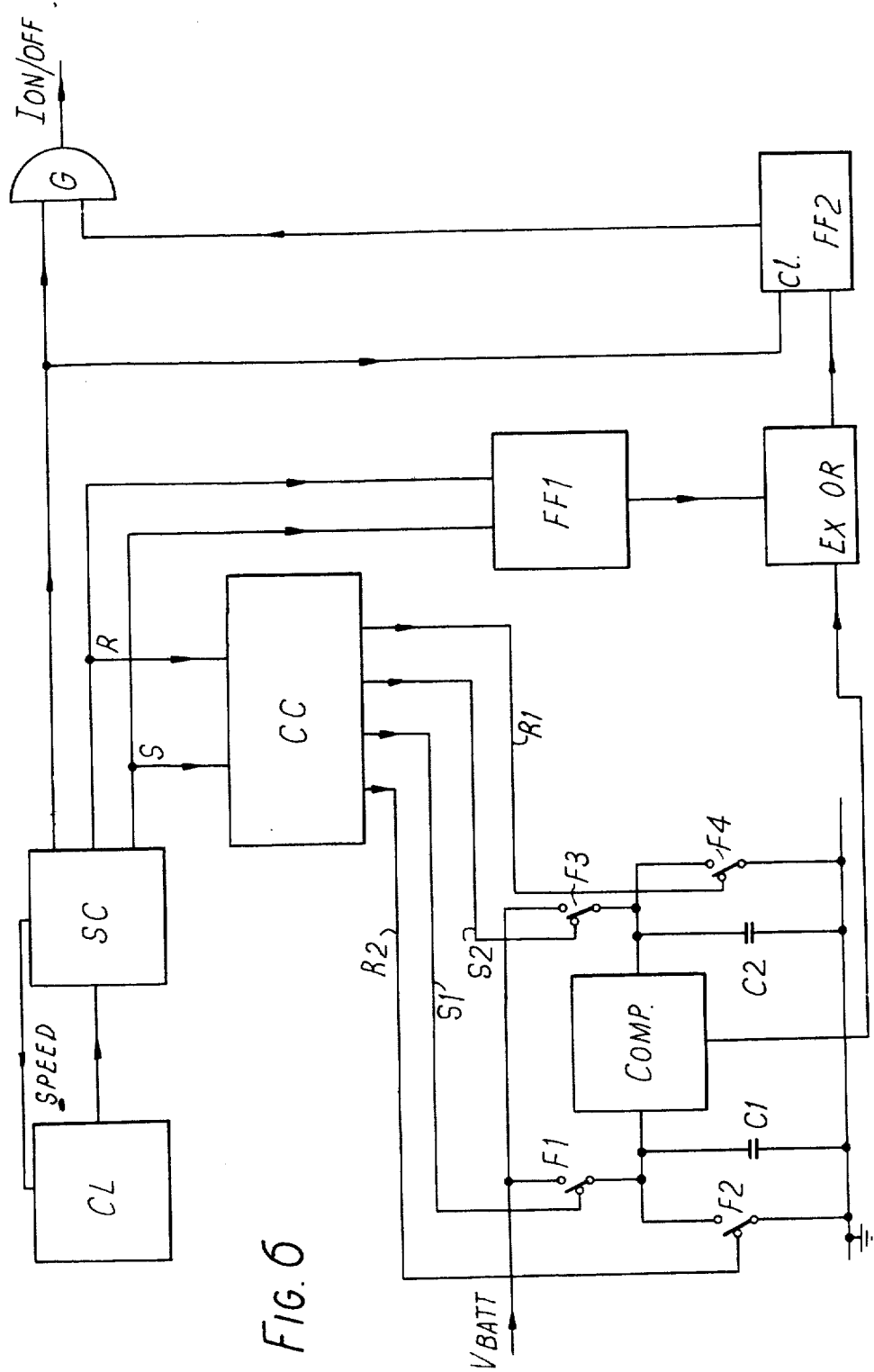
Figure 8A:
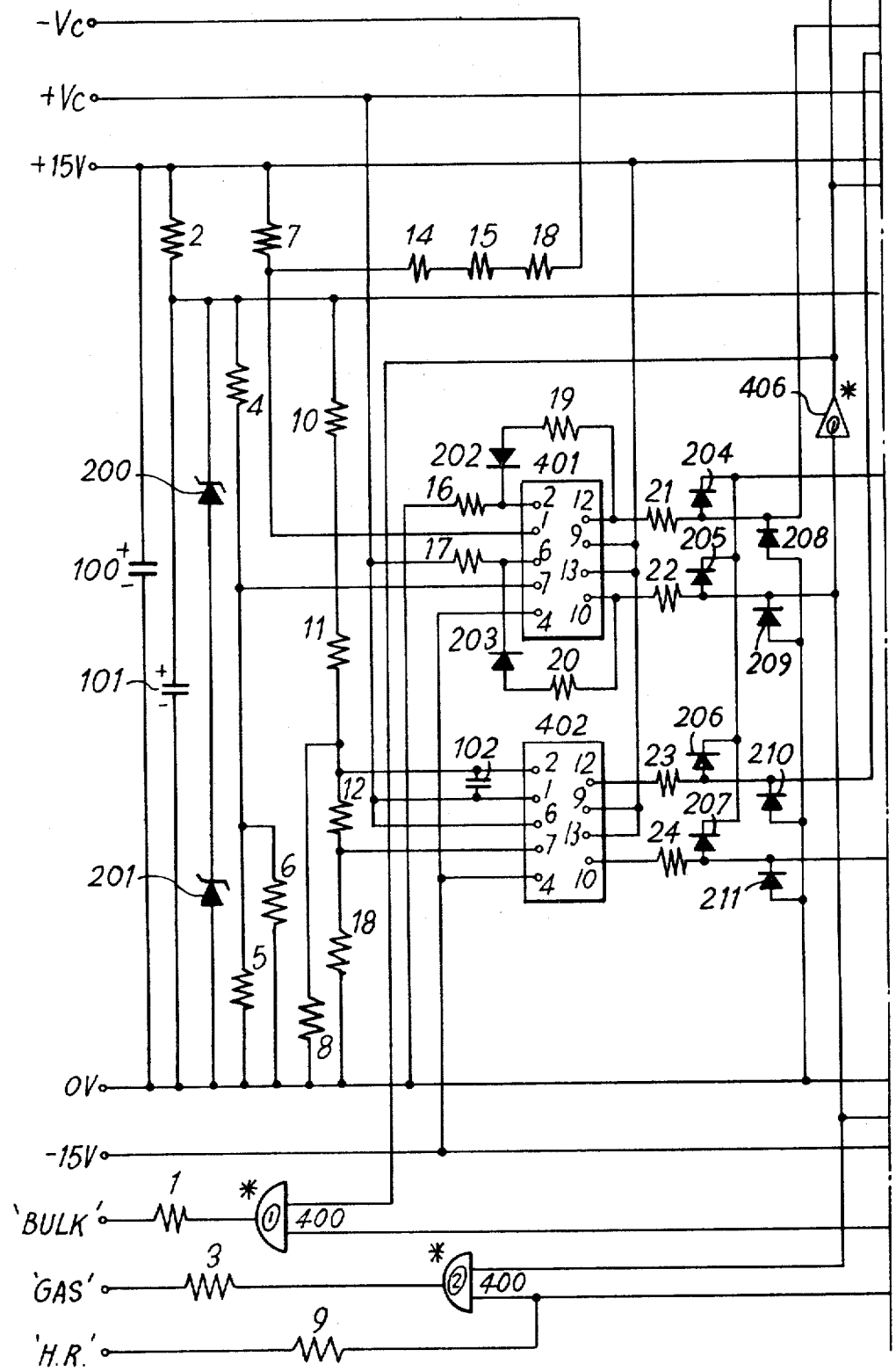
Figure 8:
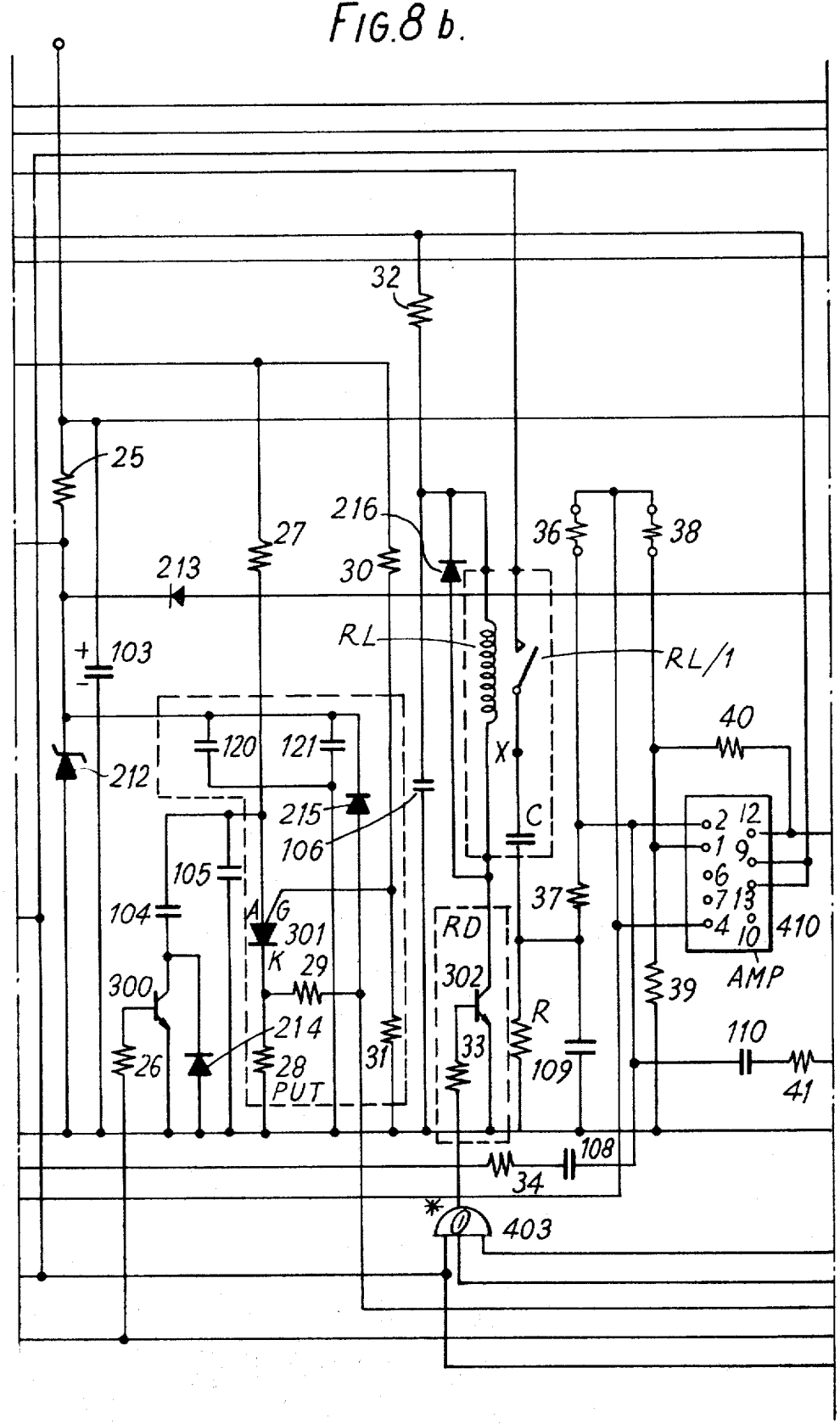
Figure 8C:
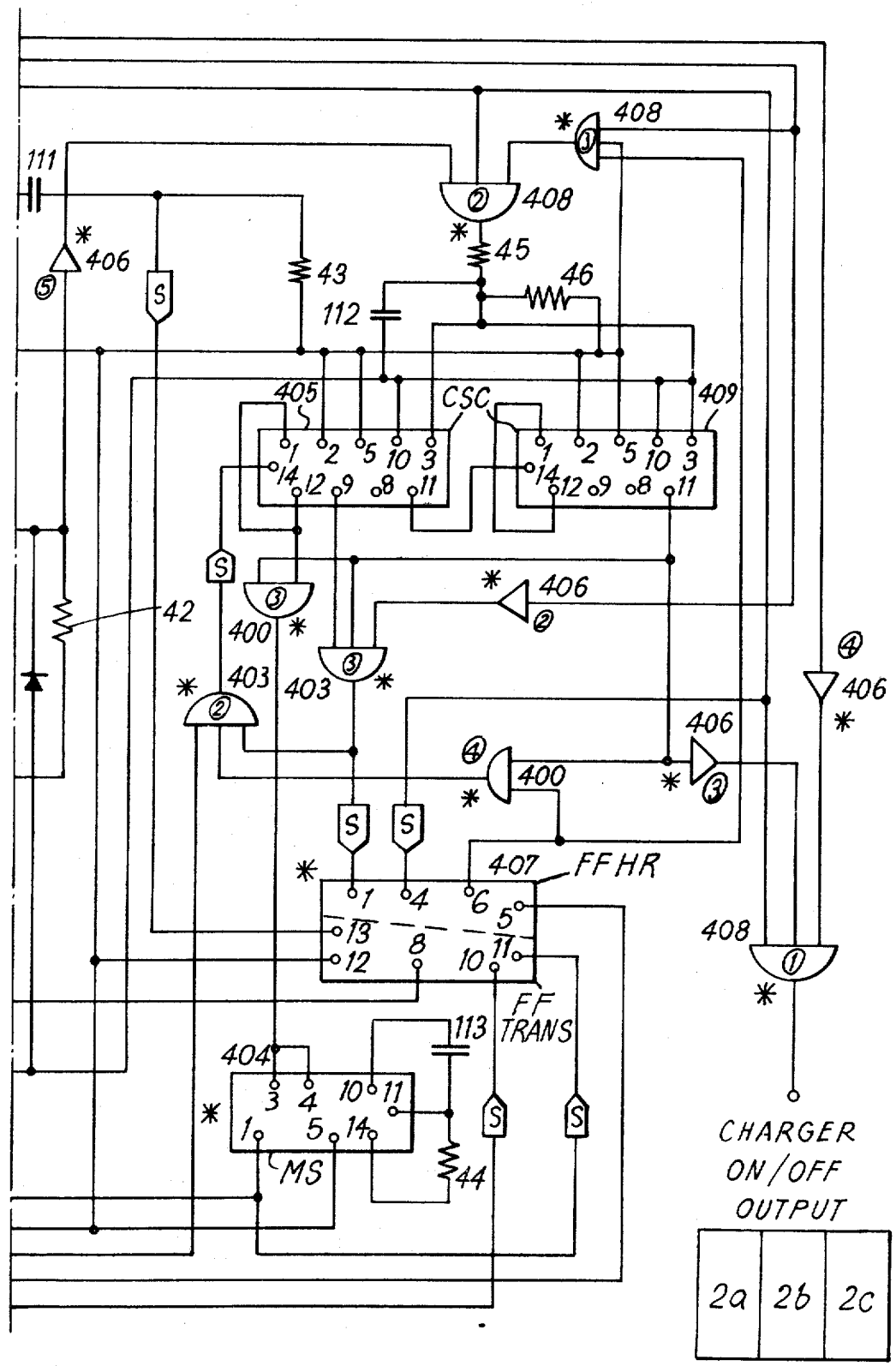
Figure 9:
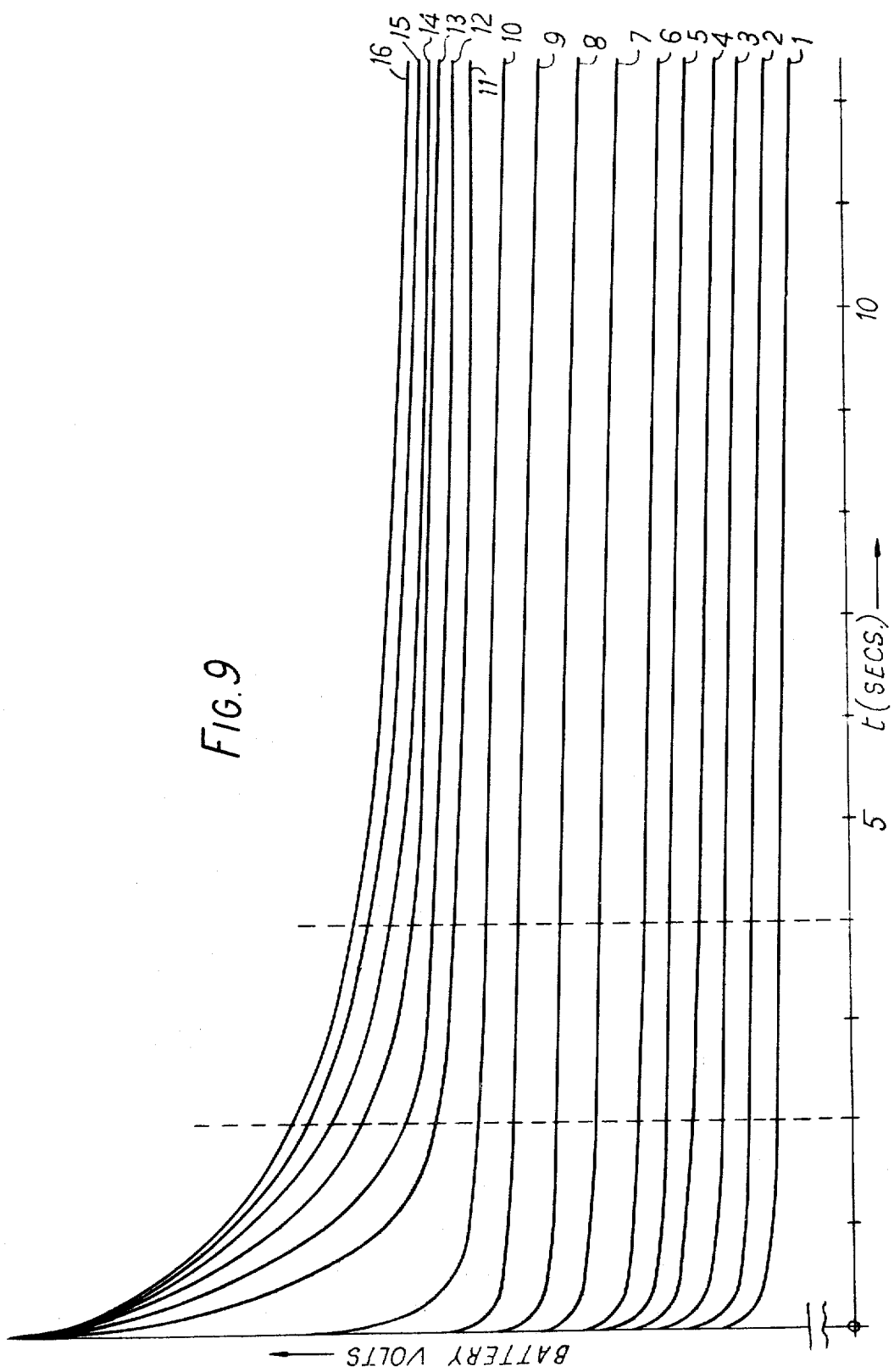

Embodiments of the invention will now be described with reference to the accompanying drawings in which FIG. 1 is a block schematic circuit diagram of a battery charger, FIG. 2 is a curve useful in describing the operation of FIG. 1, FIGS. 3a, 3b show a more detailed block schematic circuit diagram of part of FIG. 1, FIG. 4 is a curve useful in describing the operation of FIG. 3, FIG. 5 is a block schematic diagram of a further charge current controller, FIG. 6 is a block schematic diagram of a charge termination controller, FIG. 7 is a block schematic circuit diagram of a battery charger control circuit, FIGS. 8a, 8b, 8c show a more detailed circuit diagram of the schematic of FIG. 7 and FIG. 9 is a set of curves representing the fall in the battery voltage on the interruption of a charge.

FIG. 1 shows a block schematic diagram of a battery charger embodying the invention. The actual charging circuit extends from the a.c. supply terminals which would normally be connected to an a.c. supply main through the contacts of a switch S1 and two semiconductor controlled rectifiers SCR arranged for bidirectional controlled conduction to the primary of a transformer T1. The secondary of the transformer T1 is connected to a smoothing choke L1 and diagonally-opposite terminals of a diode bridge rectifier D. The other diagonally-opposite terminals of the bridge D are connected to a connector for a battery to be charged through a current-measuring shunt Sh1. The shunt is provided with terminals A and B so that the charging current $I_{BATT}$ can be measured by a suitable device. A further terminal C is provided so that another suitable device connected to terminal C and B can measure the voltage across the battery $V_{BATT}$. The battery is indicated at BATT. A firing angle control circuit FAC, operated in a manner to be described later, enables the conduction angle of the control rectifiers SCR to be controlled to control the current $I_{BATT}$ and therefore the rate at which the battery is charged. It will be apparent that $I_{BATT}$ and $V_{BATT}$ can be varied by the control of the firing angle to achieve control of the rate of charge.

At this point it is as well to consider the mode of operation of the battery charger described. A normally-discharged battery when connected to the charger will be provided with a charge in three distinct phases. In the first bulk-input, phase, charge is given at a constant current $I_B$ which is determined by either the maximum current that the charger can supply or the maximum current that the battery can withstand having regard to life etc. Of course other values of $I_B$ can be used as will be apparent to those skilled in the art. Furthermore the bulk-input phase need not be at a constant current. For example this phase could be at constant power from a supply. Thus when the supply is of limited capacity, say a domestic 13A socket, the minimum charge duration can be achieved. The battery cell voltage is monitored continuously during the bulk-input phase and when a value characteristic of the onset of gas production for the battery being charged is attained the block-charge is terminated. For a lead-acid battery this is typically 2.35 v/cell.

At this point a taper-charge phase commences. During this phase the current is reduced, as the battery voltage rises, in accordance with a pre-determined charging taper. During the taper phase the charge is interrupted at intervals and the battery voltage is measured to assess the state of charge of the battery. One particular method of assessment will be described in detail hereafter. When by whatever method is chosen the battery is assessed as being fully-charged the taper phase is terminated in its turn and the final, hold-ready, phase commences. In the hold-ready phase the battery is charged at a value of current lower than $I_B$, which value may be constant or modified in accordance with the taper characteristic or other desired form for periods of time in the order of 1 or more minutes. The charge is terminated at the end of each period and the battery voltage is monitored so that when it decays to a predetermined level the charge may be recommenced. This hold-ready phase continues until the battery is removed from the charger. The charger is of course provided with various protection circuits and other ancilliary controls which will be described in more detail later.

An important distinction between the charger described above and those proposed hitherto should be emphasized at this point. In known lead-acid traction battery chargers current is switched off and on in the primary circuit by means of an electro-mechanical switch and the flow of current from the secondary circuit through the rectifier to the battery is controlled by a choke in the secondary circuit dimensioned having regard to the battery to be charged and the rate of charge required. In such chargers it is known to incorporate a choke which may be tapped, in the position shown for L1 in FIG. 1 so that what is called a "taper" charge is achieved. The choke may be in the primary or secondary circuit. A taper charge is one in which the charging voltage is increased as the battery voltage rises during a charge to achieve a particular relationship between the voltage and current at any time. This relationship may be of the form $I_{BATT}=(b-V_{BATT})/c$ where $b$ and $c$ are constants. However a single choke or even a tapped choke is only going to achieve the desired results for a particular value of input voltage and a particular battery. With variation in input volts and variation in battery conditions over its life the charger is not going to be working at its maximum effectiveness. It should also be noted that in chargers proposed hitherto in which some form of current-pulsing is employed the current has been switched off and on by the operation of an electro-mechanical switch in the primary circuit with all the well known disadvantages of using electro-mechanical devices for such a frequent heavy duty. It will be seen from FIG. 1 that a semiconductor controlled rectifier arrangement SCR is included in the primary of the charger circuit. Choke L1 is dimensioned having regard to the maximum current to be delivered by the charger while the controlled rectifier SCR acts as a low-loss regulator and switch which, by appropriate control of the firing angle, can produce any of a wide range of characteristics merely by changing circuit constants and also switch the charging current off and on without the wear and tear associated with the previously used electro-mechanical contactors. Such characteristics could include a step-wise approximation to the straight-line taper above. A simple switch S1 is provided in the present arrangement for electrical protection reasons.

The circuit of FIG. 1 will now be described in more detail, with reference to a charging operation. It is assumed that the charger is connected to a suitable electrical mains supply and that an appropriate preferably mechanical control has been operated to latch close switch S1. The $I_{BATT}=0$ line will carry a signal inhibiting the conduction of SCR and as no battery is connected to the terminals of the charger there is no voltage across the terminals B and C. All the logic circuit is set to a starting condition at this point. The voltage signal $V_{CELL}$ generated by the circuit $V_{SIG}$ will thus be less than 1.5 volts per cell of the battery type for which the charger is designed. Accordingly the circuit block of the battery cell voltage sensor VS identified by 1.5 will supply an output indicating that the cell voltage is less than 1.5 to inhibit the operation of sequence controller SC and to supply an inhibit signal to the $I_{BATT}=0$ line. SC is shown in detail in FIG. 3. This signal will inhibit the action of the firing angle controller circuit FAC and prevent the controlled rectifiers SCR passing any current but it will not release the switch S1 through the action of the circuit $TO_{FAIL}$ which protects against the failure of the rectifiers SCR to turn off as no current is passing.

Accordingly if a battery is now connected to the charger its voltage will be applied by circuit $V_{SIG}$ to the cell voltage sensors of VS, identified at blocks 2.9, 2.35, 2.2 and 1.5, which are the values of the respective cell voltages at which the sensors respond. It is assumed firstly that the battery is normally-discharged and that the cell voltage is accordingly less than 2.2 volts per cell but more than 1.5 volts per cell. Other cases will be described later. Accordingly the inhibition produced by the 1.5 volts per cell detector will be removed and the $I_{BATT}=0$ line will no longer inhibit the operation of the firing angle controller FAC. It should be observed at this point that all the various units referred to are powered from a power supply unit PSU connected to the supply mains after the contacts of the switch S1, through a transformer T2.

The firing angle controller is not brought into operation immediately on removal of the inhibition of the line $I_{BATT} = 0$. The start delay circuit identified as SD delays the operation of the firing angle control circuit for about 1 second to enable various protection circuits described later to operate if required. The delay also permits the proper engagement of the battery plug-and-socket connector. If at the end of this delay all is in order the firing angle control circuit is energised to supply current to the battery. The actual firing angle is controlled through the firing angle represented by this block includes an operational amplifier operating in a feed back loop to which analog control inputs can be applied. Three inputs are shown in FIG. 1. One of these is inhibited for the moment through the operation of the block indicated as INHIBIT 1. Of the other two inputs one is a block charge current reference signal derived from the circuit indentified as $I_R$ and the other input represents the actual current supplied to the battery as measured by the voltage across the terminals A and B of the current shunt Sh1 and represented to the circuit $I_{CON}$ by the operation of the current signal generating circuit $I_{SIG}$. The time constants of the operational amplifier are chosen so that the firing angle controller is set so that current flow builds up under the control of the operational amplifier towards the value set by the $I_R$ from the zero value caused by the operation of the delay SD. The (bulk-input) phase is now in progress and the bulk-input current is maintained at the constant current chosen by the designer of the set and represented by the reference $I_R$ even though the mains input voltage may vary or other local condition may change. The reference is derived from a stabilised voltage from the supply unit PSU and will therefore not be affected by mains variation. The bulk-input charge can therefore take place most effectively.

As the bulk input phase proceeds the battery voltage will rise. The volts per cell generated from the circuit $V_{SIG}$ will eventually reach the value equivalent to 2.35 volts per cell, at which value the appropriate detector block operates. This operation removes the inhibition from the circuit INHIBIT 1 on the third input to the circuit $I_{CON}$ and also brings into operation the sequencer controller SC, a clock pulse generator CL including a programmable uni-junction transistor, a voltage controlled oscillator VCO, a timer circuit 1000mS to time a period of 1000mS and a detector circuit DET. The clock CL can be operated at either of two speeds under the control of the detector circuit DET in response to the operation of the up-down counter N which counts the number of cycles generated by the controlled oscillator VCO in the 1000mS period of the timer. The frequency of the oscillator VCO is determined by the actual value of the volts per cell represented by the positive $V_{CELL}$ signal generated by the $V_{SIG}$ circuit. When the 2.35 volts per cell sensor is operated the sequence controller SC is cleared and the clock CL started. The clock runs at a rate of approximately one short pulse every 8 seconds. The sequence controller counts these pulses up to a value of 128, that is approximately 15 minutes. On reaching the count of 128 the sequence controller supplies a signal to the $I_{BATT} = 0$ line to curtail the operation of the firing angle controller under the control of circuit $I_{CON}$ and therefore switch off the current actually supplied to the battery. The sequence controller continues to count the clock pulses.

After the charging current is switched off the circuit $V_{SIG}$ supplies a $V_{CELL}$ voltage signal which represents the actual battery voltage per cell on open circuit. This signal is applied to the voltage control oscillator which generates a frequency centered on the value of approximately 5 KHz with a deviation rate of approximately 2 KHz/volt. The output of the voltage controlled oscillator will therefore be a frequency representing the actual battery volts per cell on open circuit. The 1000mS timer can be brought into operation by the sequence controller to supply the output frequency of the oscillator VCO to the up-down counter N.

As described above the sequence controller SC continues to count clock pulses after the 128th count. At various points during this continuing count the sequence controller initiates the operation of the up-/down counter N. Each of four counting operations in counter N represents the battery cell voltage at a particular point in time determined by the sequence controller SC. The cell voltage is represented by the number of cycles of the voltage controlled oscillator which pass through a gate enabled for an interval determined by a 1000mS timer. In a preferred embodiment the up-/down counter is operated at two similar points in each of two successive cycles of the sequence controller. In each cycle the counter is operated at counts 132 and 134. An each counting increment on the sequence controller in this mode represents approximately 8 seconds it will be seen that the first measurement of battery cell voltage is made approximately 30 seconds after the termination of charging current flow and that the second measurement is made some 16 seconds after the first. In the first cycle of the pair of cycles during which battery voltage is assessed the counter is counted up at count 132 and down again at count 134. As will be seen from the reference below to FIG. 4 the voltage at count 134 will be slightly less than that at count 132 and accordingly the counter will have a small count in the upward direction remaining after the counting operation at count 134 of the sequence controller. In the second cycle of the pair of cycles of the sequence controller the count of 132 is again in the downward direction and the final count, at 134 in the second cycle, is in the upward direction. It will be seen that the count in the second cycle starts at the residue of the first cycle count and that the first, larger, count is made in the downward direction. Accordingly if the difference between the battery voltage is at count 132 and 134 in both cycles of the pair is the same the up/down counter will return to a substantially zero value. If however the battery is not yet at a charge condition at which the taper phase is to be terminated there will be a difference between the counts in the first and second of the cycles of the pair and the second cycle will not restore the up/down counter to a substantially zero condition.

The general counting operation particularly described above can be represented as follows. The number of cycles of the voltage controlled oscillator occurring during the operation of the timer at the beginning and the end of the constant interval occurring a constant period of time after the end of charging current flow and identified as A and B respectively. Thus the number of cycles from the voltage controlled oscillator during the first of the pair of cycles of the sequence controller will be $A_1$ and $B_1$ while those in the second cycle of the sequence controller will be $A_2$ and $B_2$. By the operation of the gates at the input of the up/down counter N the algebraic values of these numbers of cycles become $+A_1$, $-B_1$, $-A_2$ and $+B_2$. At the end of the pair of cycles of the sequence controller SC the count in the counter N is ($A_1 - B_1 - A_2 + B_2$). If the value of this count is zero ±1 the change in battery voltages during the similar intervals of the pair of cycles of the sequence controller is considered to be constant for the purposes of this assessment. The uncertainty to with-in ±1 in the preferred embodiment represents an uncertainty of 0.5 millivolts per cell.

Referring again to FIG. 1 in the preferred embodiment the sequence controller SC produces an output at count 132 which causes the 1000mS timer to enable gate $G_4$ for the duration of the timer's operation to permit the flow of the output frequency of the voltage controlled oscillator VCO as determined by the cell voltage to the gates UP and DN which directs the frequency to the appropriate input of the up/down counter N. The flip-flop F1 responds to the sequence of timing signals at various counts of the sequence controller SC to produce the appropriate counting sequence for the up/down counter by enabling and disabling the gates UP and DN. On each of the pair of cycles the sequence controller produces a count at count 135 which enables one control input of the gate forming the detector DET. Another input of the gate is however disabled during the first of a pair of cycles by the operation of the flip-flop $F_1$ which, as mentioned above, also controls the direction of the up/down counter N. Thus on the second of the pair of cycles the gate DET is enabled to assess the count in counter N. If this is zero ±1 the output of the detector gate DET applied to the second flip-flop $F_2$ causes this flip-flop to apply a signal to the clock pulse generator CL to increase the rate at which it generates pulses supplied to the sequence controller SC. This change in clock pulse generation rate indicates the termination of the taper phase of operation of the charger.

If at count 135 the detector DET does not assess the contents of the counter N as indicating that the taper phase should be terminated then at count 136, flip-flop $F_2$ not having been operated, the counter of the sequence controller is reset so that a further pair of cycles of operation of the sequence controller is initiated, and the clock pulses from the clock pulse generator CL at the slow rate are again counted for a period of 128 counts during which charging current is permitted to flow to the battery under the control of the firing angle controller FAC to permit a current flow set by the combined operation of current controller $I_{CON}$ and the taper controller also shown in FIG. 1.

An important feature of the taper-charge phase described above is that the battery condition which is measured to assess the degree of charge is the open circuit battery voltage some seconds after the termination of a charge. It has been found that the open circuit battery voltage decays rapidly in the first few seconds after termination of charge but then decays more slowly. By measuring the rate of decay of the slower portion of the decay characteristic a much more consistent assessment can be made of battery charge condition even if there are variations in the charge current immediately before termination of charge.

In addition to the battery charge assessment mentioned above during the taper-charge phase there is of course the requirement to control the actual current supplied to the battery during this phase. Reference is here directed towards FIG. 2 which shows a V/I plot of the desired charge characteristic. The line parallel to the voltage axis represents the constant current bulk-input phase. The sloping lines represent the taper characteristic. One line is projected to intercept the current axis at the value $I_{VO}$. This value of current is very much larger than any current that could be supplied to the battery during charge without damaging but is a useful parameter in determining a suitable charge characteristic. By supplying voltages which are analogs of the two quantities $I_{VO}$ and the voltage $V_{BATT}$ across the battery, to an operational amplifier circuit it is possible to generate a function representing the taper characteristic. This operation is accordingly performed by the circuit blocks represented at TAPER and $I_{VO}$ in FIG. 1.

The value of $I_{VO}$ is generated as a reference voltage by a potential divider supplied from the stabilised output of the power supply unit PSU. If, for a different battery a different taper, $I_{VO}'$, is required the potential divider can be altered accordingly.

The output of this operational amplifier is applied through the circuit INHIBIT 1 during the taper phase to the current controller $I_{CON}$. By using the negative value of the cell voltage $V_{CELL}$ it is impossible for the taper circuit to increase the battery charging current above the block charge value $I_B$. The time constants of the taper controller operational amplifier are much longer than those of the $I_{CON}$ operational amplifier so that while the latter maintains the value of current reasonably constant in the short term the taper controller produces a long term drift in current towards the lower value required by the taper characteristic. By choosing another value of $I_{VO}$ e.g. $I_{VO}'$ and an appropriate charge value $I_B$, another type of battery can be charged. The change is only a matter of changing component values to vary the operational amplifier action.

In the third, hold-ready phase the charger is operated under the control of the speeded up clock CL and the 2.2 volts per cell detector. The counter, as before, counts up to 128 pulses but these now take some 2 minutes and during this time the battery is charged, preferably under the control of the taper circuit through the circuit $I_{CON}$. At the end of this time the charge is terminated and no further charge is supplied until the 2.2 volts per cell circuit indicates that the cell voltage has fallen below this value. At this point the sequence controller again starts the clock for a further 2 minutes charge period under control of the taper circuit. As explained above the hold-ready phase can continue indefinitely.

The firing angle control circuit FAC is preferably supplied with an accurate representation of the input waveform through a separate transformer $T_3$ to avoid errors in firing angles due to phase shift in transformers with loading.

Two protection circuits are provided, one of which has been mentioned above as the circuit $TO_{FAIL}$. This circuit trips the contactor S1 if, although the line $I_{BATT}$ = 0 is indicating that no current should be flowing, the $I_{SIG}$ circuit indicates that a current is flowing. This condition could be caused by failure of the controlled rectifiers SCR to turn-off. The other protection circuit is that identified as SHAPE this operates in response to the current and battery voltage during the taper phase to ensure that the desired taper characteristic is not exceeded. If the current exceeds the value permitted by the taper characteristics $I_{BATT} = (b - V_{BATT})/c$, where $b$ and $c$ are constants, S1 is also operated to disconnect the charger from the supply.

If the battery voltage per cell is outside the range 2.9–1.5 volts then no sensor responds and no charge current flows, however switch S1 remain closed.

If a partly charged battery is connected to the charger with S1 closed the appropriate voltage sensor responds to initiate the respective charge phase. It will be apparent that the battery can quickly reach the hold-ready phase if nearly fully charged when connected i.e. above 2.35 volts/cell.

The bulk input phase will not take place and the taper phase will quickly reach a point in which counter N reads substantially zero at the end of a cycle.

The various circuit blocks referred to in the description of FIG. 1 will now be described in more detail. Each of the cell voltage detectors, for 1.8, 2.2, 2.35 and 2.9 volts per cell, includes an operational amplifier connected to act as a voltage level sensor. Other level sensing circuits may of course be used but this particular form has been found satisfactory in terms of accuracy and stability of response. The voltage controlled oscillator, in a preferred embodiment, is a Signetics function generator type SE566T or an operational amplifier connected as an oscillator. This device will produce an output at 5KHz for a nominal input voltage of 2.5 volts and the output frequency will be varied over a range of frequencies in accordance with the variation of the input voltage. The 1000mS timer is an integrated circuit monostable, such as a Texas Instrument type SH74121N. This is triggered by a signal from the sequence controller SC as described below in greater detail with reference to FIG. 3. The clock pulse generator CL includes a programmable uni-junction transistor (p.u.t.) connected as shown in FIG. 3. The bias determined by the potential divider of resistors R31 and R32 maintains the p.u.t. T32 in the non-conducting condition until the voltage of capacitor C31 built up by its charging through resistor R33 from the +15 volt line causes the p.u.t. to conduct through the resistor R34. The capacitor C31 discharges very rapidly through the low resistance of the conducting p.u.t. and the discharge current pulse produces a voltage pulse across resistor R34 which supplies to the output terminal OP a pulse clipped by the diode D31. Capacitor C31 then recharges through resistor R33 to produce a further pulse after an interval. In order to change the rate at which the pulses are generated an extra capacitor C32 may be switched into the circuit by the action of transistor T31. When the base of transistor T31 is connected to the +5 volt line through resistor R35 transistor T31 conducts and capacitors C31 and C32 together are charged through resistor R33. With the values shown in FIG. 3 the circuit pulses at the rate of one pulse per second with C31 alone and at the rate of one pulse every 7.5 seconds with both of capacitors C31 and C32 in circuit. The control voltage for the base of transistor T31 is derived from the detector circuit DET and is the SPEED signal shown in FIG. 1.

Referring again to FIG. 3 this shows the sequence controller SC and some of its associated circuits in greater detail. The sequence controller includes counter B1/B2 and gating matrix GM1.

The output terminal OP of the clock pulse generator CL is connected to a binary counter formed of two four stage sections B1 and B2 connected in cascade. This counter is provided with reset connections at RS operated in a manner to be described below and has one output connected to indicate the occurrence of a count of 128 and upwards. Other outputs of the counter B1/B2 are connected to the gating matrix GM1 in which by appropriate manipulations, including inversion, outputs are provided with enable four 8-input gates one at each of the counts of 132, 134, 135, and 136 respectively. These values refer to the preferred embodiment only and are not limiting on the scope of the invention. Outputs from gates 132 and 134 are connected to elements of a further matrix M2 composed of 2-input gates. There are four gates in the matrix M2; two gates each have an input connected to the 132 gate output and the other two gates each have an input connected to the 134 gate output. The Q and $\bar{Q}$ outputs of a flip-flop F1 are connected to pairs of the gates to cross-couple the inputs as shown in FIG. 3. Flip-flop F1 has two control inputs the clear, CL, and the preset, PS, as shown in FIG. 3. The clear input is responsive to the voltage level transition on the output of the 2.35 volt cell voltage detector which occurs at the end of the bulk-input charge phase, when the taper phase is started. This sets the output of flip-flop F1 to provide enabling inputs to gates M2A and M2B of matrix M2. The other gates, M2C and M2D, are disabled by the other output of the flip-flop.

On the occurrence of count 136 the gate 136 is enabled and the output of this acts on the preset terminal PS of flip-flop F1 to transpose the levels of its outputs, disabling gates M2A and M2B and enabling gates M2C and M2D. The outputs of M2A and M2C are connected to an up gate UP and the outputs of gates M2B and M2D are connected to a down gate DN. On considering two succeeding cycles of the counter B1/B2 it will be apparent that during the first cycle at count 132 gate M2A produces an output to enable the up gate UP that at count 134 gate M2B is enabled to in its turn enable the down gate DN in place of the up gate UP.

Continuing in the same cycle at count 136 the flip-flop F1 is reset disabling M2A and M2B and enabling gates M2C and M2D. Then in the succeeding cycle at count 132 the respective gate enables gate M2C of matrix M2 which in its turn enables the down gate DN again. Finally at count 134 in the second cycle the gate M2D is enabled to again enable the up gate UP.

The UP and DN gates can enable further gates G1 and G2 respectively to supply pulses from the other inputs of gates G1 and G2 to a four stage up/down counter N, which may be an integrated circuit SN74193N.

The pulses counted in counter N are those generated by the voltage controlled oscillator VCO in response to the battery cell voltage. The output frequency of the voltage controlled oscillator is determined by the battery cell voltage in the manner described above and this output frequency is applied to one input of a gate G3. The other input of the gate G3 is enabled for a period of 1000mS by the monostable 1000mS which in its turn is enabled through the gate to the inputs of which are connected the outputs of gate 132 and 134. The arrangement thus far described is that by which timed bursts of pulses representing the instantaneous cell voltage are routed to the appropriate inputs of the counter N, which is the up-down counter previously referred to with reference to FIG. 1. In a preferred embodiment of the invention the number of pulses produced by the voltage controlled oscillator during the period of the 1000mS timer will exceed by several orders of magnitude the capacity of the binary counter N. However it has been found practicable to make use of the four stage counter instead of a larger counter and to base the comparison on only the three more significant digits counted by counter N. Thus the most significant digits and at least significant digit are not taken into account on the comparison, the least significant because it is too small and the most significant because they remain constant during the period under consideration. Accordingly the outputs of orders $N^2$, $N^3$ and $N^4$ of counter N are connected to respective inputs of a NAND gate, to other inputs of which are connected the outputs of the gates enabled at count 135 and the $\bar{Q}$ output of flip-flop F1. The levels of the last two inputs to the NAND gate are so chosen that the gates can only be enabled during the second of the two successive cycles described above by the action of the flip-flop F1 and at count 135 in this second cycle by the action of gate 135. The output of the NAND gate is applied to an input of a flip-flop F2 which is cleared simultaneously with flip-flop F1. The Q output of flip-flop F2 forms one input of a further gate to the other input of which is supplied the output of counter gate 136. The Q output of flip-flop F2 is also applied to the base of transistor T31 through resistor R36 to form the SPEED signal referred to with reference to FIG. 1. Flip-flop F2 can only produce a Q output when the result of the two up and two down counts in a pair of successive cycles which represents the change in the decaying of open circuit battery voltage between counts 132 and 134 in the successive cycles is too small to leave any residue in order $N^2$, $N^3$ and $N^4$ of counter N at count 135 in the second cycle. It will be seen that if flip-flop F2 does not produce a Q output the counter B1 and B2 is reset and that this resetting, through the gate connected to the count of 128 output of counter B1 and B2, causes the appropriate signal on the line $I_{BATT} = 0$ of FIG. 1 to permit more current to flow to charge the battery for a further period of time represented by the count of 128 of counter B1 and B2.

Thus from the time that battery cell voltage detector 2.35 volts responds to this value of battery cell voltage to start the taper charge phase the taper charge phase proceeds under the control of the clock and the sequence controller in a series of pairs of sequence cycles during each pair of which series two values of open circuit battery voltage decay at similar times after the cessation of battery charge are measured and then compared to assess the battery charge condition. When the difference between two values of the decay in one pair of cycles as measured by the counter N is within the predetermined difference then the flip-flop F2 is operated to terminate the taper charge phase. It should be observed that the counter N is reset by a transient signal at the end of a pair of cycles. This signal is derived from the $\bar{Q}$ output transition of flip-flop F1 via capacitor C33.

The elements of FIG. 1 which have not been described in greater detail will be readily constructed by those skilled in the art. Thus the elements $TO_{FAIL}$, SHAPE and INHIBIT 1 are gates. If it is desired to reduce mains borne interference to a minimum it would be possible to use a "burst-fire" type of control as the period for which current flows in the battery charging circuit is long compared with the frequency of an alternating supply. The operational amplifier controllers can be constructed in accordance with conventional analog circuit techniques and the $I_B$ and $I_{VO}$ reference signals generated from the stabilized outputs of the power supply unit PSU.

An important feature of the invention will now be referred to with reference to FIG. 4. The graph shows the decay of the open circuit voltage per cell of a battery which has been disconnected from the charging source at time $t_o$. Only a small portion of the voltage axis is shown and by way of example this is indicated as covering the range between 2.34 and 2.37 volts approximately. These values are purely by way of example and not to be considered as limiting on the scope. It has been found that the open circuit cell voltage falls rapidly immediately after $t_o$ but after a longer period of time the rate of this fall reduces and it has been proposed that the interval to time $t$ at which the open circuit voltage per cell attains some predetermined value K be measured during successive periods each immediately after a charging period has terminated at time $t_o$. However it has also been found that the exact form of the decay curve is dependent to a large extent of exact value of sustained current $I_{BATT}$ just before $t_o$. The two dotted curves, one on either side of the solid line of FIG. 4 represent a typical variation and it will be seen that the values of $t_1$ and $t_2$ represent a significant variation from the desired value for $t$. To overcome this shortcoming it is proposed that the open circuit voltage be allowed to decay for a fixed period of time extending from $t_o$ and that the voltages at the end of this period and at a short interval of time thereafter be measured and compared to give a value for the rate of change of open circuit battery voltage at a known point in time after the termination of charge period at $t_o$. The decay over this timed interval, referred to here in terms of the embodiment previously described at $t_{132} - t_{134}$, is $dV_{CELL}$ and it will be seen from FIG. 4 that this has a substantially constant value for all three curves. The quantity $dV_{CELL}$ is therefore a much better basic for assessing the state of charge of the battery than the hitherto proposed arrangement in which the time to decay to a predetermined open circuit voltage from the cessation of charge is measured. In particular the displacement of the curves in the region $t_{132} - t_{134}$, by for example mains voltage fluctuation, does not afford the assessment as the gradients of the curves are substantially the same at this point. The essential feature here is the elapse of time from $t_o$ to $t_{132}$ and the subsequent measurement of a short interval thereafter to $t_{134}$ during a period of time in which no charge at all has been supplied to the battery. During the interval $t_{132} - t_{134}$ the curves all have substantially equal gradients and therefore the assessment of battery charge by measuring change in cell voltage over an interval is reliable. Provided the period during which charge stops is longer than that for $t_{134}$ the period can be determined appropriate to the particular charger design.

In particular the improved method of assessing battery charge conditions is very suitable for use with the taper charge controller described in the above embodiment or in other controller or ballast circuits in which there may be a greater change in the value of $I_{BATT}$ between successive measurements of the value of $dV_{CELL}$.

Returning now to FIG. 3 and the end of the taper charge phase as indicated by the operation of flip-flop F2 to supply the SPEED signal to the p.u.t. clock CL the generation of the Q signal by slip-flop F2 inhibits, in combination with the "count of greater than 128" signal, gate G5. This inhibits the operation of a clock gate G6 which would otherwise supply the clock pulses to the counter B1 and B2. Thus although the clock speed has been increased the pulses are not supplied to the counter, the counter remaining stopped at the value of 135. However there is a further provision for the resetting of the counter by the operation of the detector which is responsive to the value of $V_{CELL}$ being less than 2.2 volts. In passing it is observed that the sequence controller SC cannot be brought into operation during the period when the voltage of a connected battery is rising from 1.5 to 2.2 as there is a permanent reset provided by the unlatched 2.35 v per cell sensor of VS until the battery cell voltage has reached this value 2.35. However once the value of 2.35 volts has been achieved the 2.35 volt sensor latches in the non-resetting condition. When the taper phase is terminated the output of counter B1 and B2 at the count of 128 is maintained to ensure that no current is passed to the battery until the open circuit battery voltage per cell falls to value 2.2 volts and the 2.2 volt cell voltage detector operates to reset the counter B1 and B2. On this resetting the count of 128 output disappears enabling gate G6 and thus G5 and charging current can then again flow. This current will continue to flow until the count of 128 is again achieved by pulses passing through gate G6, this time at the fast pulse rate, whereupon the $I_{BATT} = 0$ signal is again applied to the charger to stop the charging of the battery. As the battery voltage again decays the charge is inhibited until the decay reaches the level of 2.2 volts where the counter is again reset and another charge cycle starts. This is the hold-ready phase described above. It will be seen from reference to FIG. 1 that the taper controller can continue to regulate the charge current $I_{BATT}$ if it is so desired.

FIG. 3 also shows the circuits $I_{CON}$ and taper in greater detail. The $I_{CON}$ circuit is that for the stepwise approximation to the taper $I_{V0}'$ of FIG. 2. The summing circuit input of the operation amplifier OA1 includes four circuit elements in the form of resistances $R_1$, $R_2$, $R_3$ and $R_4$. $R_1$ is supplied with a negative voltage to provide a signal representing the bulk input current $I_B$. During the bulk input phase ($V_{CELL}$ below 2.35v) both switches S2 and S3 are open. Resistor $R_2$ is supplied via $I_{SIG}$ with a positive signal to indicate the actual charging current. The circuit $I_{CON}$ will therefore supply an input to FAC to increase $I_{BATT}$ to $I_B$, and maintain it there. When $V_{CELL}$ reaches 2.35 a sensor of VS operates to close S2 and apply a positive signal via $R_3$ to replace part of the $I_{BATT}$ signal balancing the $I_B$ signal. $I_{BATT}$ is therefore reduced as shown in FIG. 2. At 2.5 volts S3 is operated by another similar sensor (not shown in VS in FIG. 1) to similarly further reduce $I_{BATT}$ to the 2.5v value in FIG. 2.

When a straight-line taper is required the resistors $R_3$ and $R_4$ are replaced by an input from the TAPER operational amplifier circuit via INHIBIT 1 of FIG. 1.

The TAPER circuit shown in FIG. 3 includes an operational amplifier OA2. The summing input circuit includes resistances $R_5$ and $R_6$ whose values are determined by the constant $b$ and $c$ mentioned earlier. These constants represent $I_{V0}$ and the V/I ratio respectively. The output of OA2 is applied INHIBIT 1 through a diode D32 to prevent a negative output signal increasing $I_{BATT}$ beyond $I_B$ as set by $I_{CON}$.

It will be apparent that the appropriate taper can be easily set by adjusting the values of resistances $R_1$-$R_6$. This is a great advantage over choke-ballast tapers in which different tapped or separate chokes have to be specially designed for each battery size and taper.

FIG. 9 shows a set of curves of battery voltage against time plotted in interruptions at 15 minute intervals during the charging of a battery. The curve nearest the horizontal, time, axis is that at the start of the charge under consideration; the curve furthest from this time axis is that at the end of the charge under consideration. The time axis is calibrated in seconds and the vertical, voltage, axis is a linear voltage scale.

When charging a battery two points in the state of charge are very significant. The first of these is the point at which significant "gassing" occurs, the second is that at which the application of further charging current will no longer increase the open circuit battery voltage. Until the first, gassing, point is reached the battery may be supplied with a charging current whose value may approach the ampere-hour capacity of the battery without very serious harm to the life or condition of the battery. However once gassing occurs the presence of the gas bubbles reduces the current which can be applied safely to the battery. The second point is important as there is no value in continuing to charge the battery once its open circuit voltage ceases to increase indicating the fully charged condition, apart from in some cases a small charge at intervals in order to maintain the fully-charged condition, as overcharging can harm the battery.

The open circuit battery voltage at which gassing occurs has a generally-accepted value of 2.35 volts per cell for a conventionally constructed lead-acid battery in new or fairly new condition. However this value of voltage will change with battery life and the manner in which the battery is used. For example in some multi-cell traction batteries it may be desirable to short-circuit one or more cells which prove faulty during life of the battery in order to obtain the maximum use from the remainder of the battery. Accordingly any device which attempts to control a charger by measuring the battery voltage and comparing this with a reference whose value has been selected on the basis of 2.35 volts per cell for a lead-acid battery will not be usable with safety on a battery with less than the nominal number of cells still in use. Furthermore towards the end of its life a battery may still be capable of providing satisfactory service but may never achieve this selected reference of 2.35 volts per cell.

A similar problem will arise with whatever means is provided to detect the fully-charged condition in terms of battery voltage as this will also have a value dependent on the life and use of the battery.

It has been found that although the absolute value of gassing voltage and fully-charged voltage may very from battery to battery and with battery life the behavour of battery voltage in the interruption of a charging current gives a consistent indication of the state of charge of the battery. Accordingly the invention provides battery charger control arrangements to assess the state of charge of the battery from the battery voltage on such an interruption occurring. On considering the curves in FIG. 9 it will be seen that the nine lowest curves are of very similar shape and are separated only by the displacement of the whole curve upwards as a result of the increase in open circuit battery voltage produced by the 15 minute charge period separating the curves. Curves 10 to 16 show a progressive change in shape, even curve 10 being distinct from curve 9. The 17th and subsequent curves are substantially coincident with curve 16. The subsequent curves need not be considered further. It has been observed that there is a close correlation between the distinct change in shape between the ninth and 10th curve and the occurrence of significant "gassing." The coincident of the 16th and subsequent curves indicate that no further increase in battery voltage is attainable by continuing the charge. Accordingly the curves reveal the two points of importance in the control of a battery charge and the embodiments to be described show circuit arrangements which assess the state of battery charge in accordance with the behaviour of battery voltage shown in the curves.

FIG. 5 shows a charge current controller which in a preferred arrangement maintains the charging current at the highest possible value consistent with satisfactory battery life, subject of course to the capacity of the charger to supply the highest value of current required. No details of the actual battery charger are necessary here as a suitable charger form will be readily selected or devised by those skilled in the art but it is preferred to use the charger circuit indicated in heavy lines in FIG. 1 more fully described above. It will also be apparent that other parts of the control circuit described in this co-pending Application may be used for the present embodiments.

In FIG. 5 the battery voltage $V_{BATT}$ is applied to a voltage controlled oscillator VCO to provide a frequency proportional to the battery voltage. This frequency is supplied to one input of each of two gates UP and DN. A sequence controller SC is driven by a 2-speed clock CL to control the supply of charging current to the battery so that charging periods of approximately 15 minutes are separated by interruptions during which no charging current flows of some 10 seconds in duration. The flow of current is stopped and started by a signal on the line indicated at $I_{ON/OFF}$. At a point just after the beginning of the interruption the sequence controller SC applies a reset signal to terminal RS of an up/down counter N. This clears the counter. At say 2 seconds from the beginning of the interruption the sequence controller SC applies an enabling signal of one second in duration, itself timed by the clock pulses, to the other input of gate UP to permit the passage of the frequency from the voltage controlled oscillator VCO to the counter N. The counter will thus register a count which represents the value of the battery voltage at this instant in time. After a further interval which may mean two or four seconds the sequence controller SC applies a further one second enabling signal this time to the other input of gate DN to apply the output frequency of the voltage controlled oscillator to the counter N. This frequency decrements the count in counter N so that the remaining count will be proportional to the difference between the value of the battery voltage when the counter UP was enabled and that when the counter DN was enabled. After a further short interval which may be another 2 seconds the sequence controller SC applies a signal to permit battery charging current to again flow. The difference count remaining in counter N is supplied to a binary/analog converter BAC to generate a voltage which represents the difference in the values of the battery voltage. This voltage is applied to a scaling unit SU. The scaling unit modifies the value the binary analog converter output in a manner which may be dependent on the actual value of the battery voltage or may be a previously determined constant-value factor to generate a signal V-nC which represents the degree to which the charging current is to be modified having regard to the state of charge of the battery as assessed by the difference value counted in counter N. This signal is supplied as one input to an arithmetic unit AU. Another input to the arithmetic unit is a voltage $V_{ref}$ which represents the maximum value of charger output current which is permitted. The arithmetic unit produces an output which represents the difference between the two inputs that is ($V_{ref} - nC$). This output signal is applied to a further circuit V/I which could be the circuit $I_{CON}$ of FIG. 9 to control the charging current I in accordance with the expression $I = (I_{max} - C')$. It will be seen from these expressions that as the difference recorded in the counter N increases the charging current is decreased in accordance with the scaling law applied by the scaling unit SU.

When the curves of FIG. 9 are considered with regard to the above operation it will be seen that for the first nine curves there is very little change in the voltage values that we measured at 2 and 4 seconds after the interruption of charge at $T = 0$ and, if desired, the scaling unit can be arranged so that there is no change in battery charging current for these relatively small changes in battery voltage value during the interruption of charge. However, it will be seen that for curves 10 onwards the difference increases steadily and that an appropriate reduction in battery charging current will therefore be made by the operation of circuit in FIG. 5. As mentioned above curve 10 corresponds to the onset of gassing. Accordingly the control arrangement of FIG. 5 provides a transition from a substantially bulk input phase (curves 1 to 9) at the maximum possible current to a charge condition related phase (curve 10 onwards) in which the charge current is steadily reduced to avoid damage to the battery by applying an excessive charging current when it is in the gassing state. It will be apparent that the transition from the bulk input to the control phase will take place not at an arbitrarily previously selected value of open circuit voltage but in response to a change in battery open circuit voltage which is closely related to the onset of gassing and is detected without reference to the actual value of the battery voltage at the time. By responding in this manner to a change in the behaviour of battery open circuit voltage during an interruption a charger can be provided which will operate satisfactorily with batteries with various numbers of cells, as will occur when one or more are short-circuited as explained above. Furthermore a battery which due to its conditions of use may no longer correspond with the conventional gassing voltage will still receive a properly phased charge. Variation of gassing voltage with temperature is also coped with.

Referring now to FIG. 6 this shows an arrangement to terminate the charging of a battery. A similar 2-speed sequence controller and clock SC and CL respectively are arranged to time the interruptions of a charging current in a similar manner to that described above. During an interruption the sequence controller produces two outputs preferably at 2 and 6 seconds of a set and reset signal respectively. The set signal is indicated by S and the reset signal by R in the diagram. These signals are applied to a cycle controller CC and to a first flip-flop FF1. The construction of the cycle controller CC will readily apparent to those skilled in the art from the following description of its function. The flip-flop may be any suitable conventional unit. The battery voltage is applied to an analog comparator including four switches, F1, F2, F3 and F4 together with two sampling voltage capacitors C1 and C2 and an analog comparator circuit element COMP which in the preferred embodiment is an integrated circuit element of the type identified by NH0042C. The switches F1 to F4 are preferably field effect transistors of the type identified by 2N3824. These switches are closed in turn by the control signals S1, S2, R1 and R2 derived from the cycle controller CC. The operation of the arrangement in FIG. 6 will be described commencing at the beginning of an interruption. At the beginning of the interruption the sequence controller SC changes the signal it supplies to the gate G to switch off the battery charging current and clear a second flip-flop FF2. Two seconds later the sequence controller SC applies a signal S to the cycle controller CC which in turn supplies the signal S1 to close switch F1 to apply the battery voltage to capacitor C1. This capacitor charges to the battery voltage during the duration of signal S1 and the voltage on the capacitor is applied to one input of the comparator COMP. As during normal operation of the control of the battery voltage increases steadily during charge if during a previous cycle capacitor C2 has been charged in the manner to be described below this will have a lower voltage than that now applied to capacitor C1 and the comparator will produce an output, which is one of two possible conditions indicating this relationship. The signal S from the sequence controller has also been applied to flip-flop FF1 to produce an output which will be the same as that which is now being produced by the comparator and these outputs are applied to the two inputs of an exclusive CR gate Hx OR so long as these two inputs are the same the output of the exclusive OR gate will switch flip-flop FF2 to that condition in which gate G is enabled by FF2 output. Accordingly when sequence controller SC again enables gate G the battery charger current will again be supplied. Returning to the interruption whose commencement was described above some 4 seconds after this commencement the sequence controller SC supplies a signal R to the cycle controller CC to generate a further signal R1 which closes switch F4 to discharge capacitor C2. This action will have no effect on the output of the comparator even though switch F1 has now opened again as capacitor C1 will retain substantially the whole of the voltage applied to it and maintained the output of the comparator in the same condition. Some 8 seconds after the beginning of the interruption the sequence controller again enables gate G and a battery charger current will continue to flow. After a period of some 15 minutes the sequence controller again interrupts the charging current by disabling gate G and two seconds later applies a signal S to the cycle controller CC to generate a signal S2 which is applied to switch F3 to supply the battery voltage to capacitor C2. Assuming the normal course of events has occured the battery voltage will now be higher than it was during the previous interruption and the comparator will change its output condition applied to the exclusive OR gate. However the signal S has also changed over the output condition of flip-flop FF1 so flip-flop FF2 is still in the condition in which it enables gate G. Four seconds after the commencement of the present interruption the sequence controller SC generates a further signal R which produces an output R2 of the cycle controller CC to close switch F2 to discharge capacitor C1 in its turn. This action again has no effect on the exclusive OR gate for reasons described above. The sequence controller will then end the interruption by enabling gate G again to permit battery charge current to flow.

On considering the curves in FIG. 9 and the line drawn to represent T=2 seconds from the commencement of the interruption it will be seen that the battery voltage will increase steadily as the charge progresses. Further on reaching the 15th and subsequent curves the battery voltage will no longer increase. In fact in practice it may reduce slightly. Accordingly there will be reached a point in which when during an interruption the comparator receives a sample of battery voltage which is no greater than that previously received and now retained on the other capacitor of the comparator. Accordingly the comparator will not change its output condition and as the output condition of flip-flop FF1 will have been changed the exclusive OR gate will now receive input signals of two different conditions. Accordingly its output will not now operate flip-flop FF2 to enable gate G. As gate G is already disabled by the output of the sequence controller SC during the interruption this has no immediate effect. However when at the end of the interruption the sequence controller applies an enabling input to gate G this will not cause the gate to be enabled as it is already disabled by the output of flip-flop FF2. Accordingly the battery charger current will not be permitted to flow and the charge will be terminated.

It will be seen that in the second described arrangement the battery voltage on the occurrence of an interruption is the basis for the assessment of the state of charge in the battery and a subsequent modification of the charging current. In this case it is the termination of the charge but it could be that the disabling of gate G is arranged to bring another charging control circuit into operation which provides for an infrequent application of a short duration charge to the battery to maintain it in its fully charged condition.

Referring to FIG. 7 this shows the main elements of the battery charger control circuit in block form and indicates the various logical operations that are carried out during the cycles of the control circuit.

In operation the control circuit will be coupled to a source of charging current, such as a semiconductor controlled rectifier bridge energised from an a.c. supply mains, to control the flow of charging current and also to the output of the charger to which the battery is connected to derive a signal representing the volts per cell ($V_c$) of the battery. The control circuit is also assumed to include an arrangement to supply electrical energy at suitable potentials to energise various circuit elements. This source would be connected in operation to the terminals marked + and 0 in the figure. The circuit may also be connected to appropriate indicators, which may be light-emitting-diodes (l.e.d.) to indicate the cycle of operation which is in progress.

In the following description it is assumed that the control circuit is connected to a charger and that both are connected to an a.c. supply mains, that the charger has been switched on and that a battery has just been connected to the terminals of the charger for charging. The control circuit includes means which may be in any of the well known forms to ensure that on switching on the various logic circuits are set at an appropriate condition to avoid any anomalous operation. The voltage $V_c$ representing the battery volts per cell will be derived from the charger output in a known manner and supplied to the four comparators in the control circuit C:1.5v, C:2.22v, C:2.35v and C:2.85v. Each of these is responsive to the voltage $V_c$ and to a respective reference voltage to provide an output indicating whether or not the voltage $V_c$ is above or below the voltage value indicated in the designation of the comparator. The reference voltages for the three lower values are derived from potential divider chain energised at a voltage stabilised by the Zener diodes 200 and 201. For the highest voltage comparator a voltage $-V_c$ of equal magnitude but opposite polarity to the voltage $V_c$ is "backed-off" against a voltage derived directly from the supply voltage for the control circuit. When the voltage resulting from the "backing-off" becomes negative with respect to the zero voltage line the output of the comparator changes to indicate that the voltage per cell exceeds 2.5v. It is assumed that a partly discharged battery with a voltage per cell above 1.5v. and below 2.22v. has been connected to the charger. Other conditions will be considered below. In this case the comparator C:1.5v operates to produce an output indicating a voltage in excess of this value and this output is applied to the gate 408/1 to permit the charger to supply current to the battery. The control circuit would hitherto have responded to the actual battery voltage, the charger not yet having been permitted to supply current. The output of comparator C:1.5v is also applied to gate 408/2 which, the previously-mentioned initial reset having occurred and been maintained by C:1.5v until it operates on the connection of a battery, will now be enabled to permit the counter/sequence-controller CSC to commence to count pulses supplied from the clock pulse generator incorporating a programmable uni-junction transistor indicated at reference PUT. Such a clock pulse generator is described above with reference to circuit CL of FIG. 3a. Transistor 300 will at this time be switched on to connect both of capacitors 104 and 105 to the clock pulse generator to produce pulses at the approximate rate of one every 3 seconds. These pulses are supplied to circuit element CSC via a gate 403/2 and a noise-suppression circuit S. Circuit element CSC is an eight digit binary counter which will thus when supplied with such pulses reach a full count in approximately six minutes. At the end of this time the highest order output, $2^7$, will become a binary 1 which when applied through inverter 406/3 will disable gate 408/1 switching off the charger current supplied to the battery. It will be seen that the operation of the circuit thus far is to supply a current to charge the battery on the connection of the battery for a period of 6 minutes at the end of which period the current is switched off. The magnitude of the charging current is preferably that suitable for the bulk-input phase of battery charging. The control of the magnitude of this current at this stage of the operation of the circuit forms no part of the present invention but a suitable controller is described in the above-mentioned copending Application. The output of the comparator C:1.5v also performs the following functions. Firstly it enables gate 400/1 to supply a "bulk" signal at its output terminal to operate an l.e.d. indicating that the bulk charge phase is in progress. Secondly it enables one input of gate 403/1 which gate controls the operation of relay driver RD to energise the coil of relay RL. The coil when energised operates the reed-relay contact RL/1 to connect capacitor C and resistor R series between the zero voltage rail and voltage $+V_c$. Capacitor C is thus charged to voltage $+V_c$. The charging current of capacitor above the flows through resistor R and when the flow is above selected value amplifier AMP generates an output pulse.

After the output $2^7$ has reached the binary 1 condition as described above the lowest order output of element CSC, $2^0$, becomes binary 1 condition on the next clock pulse. This binary 1 condition together with the maintained binary 1 condition on the $2^7$ output enables gate 400/3 one clock pulse interval after the end of the charging period. The output of gate 400/3 is applied to an input of a mono-stable pulse generator MS which generates a pulse preferably of the duration between 10 and 100 mS. The output pulse of mono-stable MS is applied to the third, hitherto disabled, input of gate 403/1 to enable this gate and operate the relay driver RD as described above. As a result contact RL/1 closes and the hitherto uncharged capacitor C is charged to the value of voltage $+V_c$. The charging current for capacitor C passes through resistor R and the amplifier AMP generates an output pulse. This output pulse is inverted in inverter 406/5 and applied to an input of gate 408/2 to temporarily disable this gate and cause the counter of element CSC to reset to zero. This resetting removes the disabling input from gate 408/1 and permits the charger to again supply charging current. The counter of elements CSC also restarts and again counts the clock pulses supplied through gate 403/2. In this way a further charging period of 6 minutes is started. It will be realised that before this happens the mono-stable MS will have time-out and the gate 403/1 will again be disabled so that the relay RL is de-energised and contact RL/1 is open leaving capacitor C charged to substantially the value of voltage $+V_c$ at a point in time 1 binary count after the end of the 6 minute charging period.

The above-described sequence of operations repeats itself so long as at the end of each 6 minute charging period a sufficient voltage difference has arisen in the value of $+V_c$ to produce sufficient current through resistor R on the closing of contact RL/1 to provide amplifier AMP with an input to produce an output pulse to cause the resetting of the counter of the element CSC by the temporary disabling of gate 408/2. As the bulk charge phase continues in this manner the value of voltage $V_c$ will tend to a constant value in the normal manner of charging batteries. If the battery is in reasonable condition and charging has progressed normally during the bulk phase the value of $+V_c$ will have exceeded 2.22 volts per cell before starting to tend to a constant value. Accordingly the comparator C:2.2v will also be producing an output indicating a value of $V_c$ in excess of its respective reference. The effects of this comparator output is to change the inputs which it has hitherto provided to gates 408/3 directly and 403/3 through inverter 406/2 from that in which the gate is disabled to that in which the gate will be enabled on the remaining disabling input changing condition. This change of comparator output has no effect on the operation of the element CSC until the input to the amplifier AMP ceases to be large enough to reset the counter. This will occur when, as mentioned above, the increase of $V_c$ between consecutive charging periods falls below a selected level. When a count 10000001 no resetting pulse is applied to gate 408/2 by inverter 406/5 the counter proceeds to the count 10000010. The binary 1 condition in the next-least significant order provides the final enabling input for gate 403/3 and the output of this gate changes condition. This change disables gate 403/2 and the supply of clock pulses to the element CSC ceases stopping the count in the last mentioned condition. The output of gate 403/3 is also applied, through a suppression circuit S, to an input of a flip-flop FF HR. An output terminal 5 of this flip-flop changes condition and this change operates on the base of transistor 300 to switch the transistor off, removing capacitor 104 from the timing circuit of the clock PUT. The removal of capacitor 104 increases the clock pulse rate by a factor of approximately three so that a full count in element CSC is made in approximately 2 minutes instead of 6 minutes. The other output 6 flip-flop FF HR changes condition and removes the enabling input from gate 408/3. This change is also applied through gate 400/4 so that its output is no longer an enabling input for gate 403/2, further preventing the passage of clock pulses. The charger current will continue to be prevented through the action of the output $2^7$ of the element CSC acting on gate 408/1 as previously described.

As charging current has ceased the battery voltage will start to decay and will eventually reach a level at which the comparator C:2.22v indicates that $V_c$ is below the reference value for this comparator. The output of the comparator will thus change condition and the enabling input through inverter 406/2 will be removed from gate 403/3. The condition of the output of this gate will change enabling the input of gate 403/2 to which this output is connected. The change in the output condition of the comparator will also act through a gate 408/3 to reset the counter of element CSC through gate 408/2. All the outputs of the counter will revert to zero. The reversion of output $2^7$ to zero will remove the disabling input supplied through gate 400/4 to the clock pulse gate 403/2 again permitting the flow of clock pulses to the counter. The flow of charger current will also again be permitted through inverter 406/3 and gate 408/1. As the clock rate pulse has been increased as above described the current will now only be permitted to flow for a period of about 2 minutes from the time that C:2.22v responds to the increasing voltage and removes the reset from gate 408/2 starting the count. At the end of this time gate 408/1 is again operated to interrupt charger current and on this occasion the transition of the output $2^7$ will also inhibit the flow of clock pulse immediately by the action of gate 400/4 on gate 403/2. Neither of the outputs $2^0$ or $2^1$ now reach the binary 1 condition so the monostable MS and its associated sampling circuitry is not brought into operation. The battery voltage is again allowed to decay until the comparator C:2.22v operates to restart a two minute charge as just described. Flip-flop FF HR is maintained in the condition at which the output terminal 5 switched off transistor 300 and this maintained condition is also applied as an output signal at terminal "HR" Signal to operate an indicator to indicate that the "Hold-ready" phase of charging is in progress.

So far no reference has been made to the operation of the comparator C:2.35v. It will be seen on examining the circuit in FIG. 7 that this comparator can operate at any time to apply an output at terminal 2.35v. OUTPUT through inverter 406/1. This signal is applied to the current control circuit of the charger to reduce the charging current on the basis that the battery will have reached the "gassing" condition. As is well known it is desirable to reduce the charging current when the battery is in this condition. An example of a suitable charger current control circuit to achieve this is described above with reference to FIGS. 1 to 4. When comparator C:2.35v operates as just described the input of gate 400/1 which has permitted the indication that the "bulk" charging is in progress is removed while an input is provided to gate 400/2 which gate, in the absence of output from flip-flop FF HR terminal 5 indicating that the hold ready phase is in progress will be enabled to provide a signal on terminal "GAS" Signal to operate an l.e.d. device indicating that a "gassing" charge limitation is in operation. C:2.35v latches on operation until the battery is removed. It is an important feature of this invention that the gassing charge current limitation is brought into operation independently of the hold ready phase. Thus if a battery is being charged which does not reach 2.35 volts it will be protected from excessive charging current by the commencement of the hold ready phase while if the hold ready phase is not commenced by the time it reaches 2.35 volts it will also be protected by the reduction of charger current under the control of the 2.35v Output Signal.

It will be apparent that the gassing current limitation will usually be applied while the battery is still being charged under the control of the sampling circuit associated with mono-stable MS. It has been observed that when the gassing current limitation is applied in this case there can be a step set-back of the value of voltage $V_c$. This reduction in $V_c$ will be sensed on the next operation of mono-stable MS by the amplifier AMP as an indication that the battery voltage has reached a constant level. As a result there will not be a resetting pulse applied to gate 408/2 and the control circuit would revert to the hold ready condition before the battery had received as much charge as it was capable of accommodating. To prevent this anomalous operation a transitional cycle is introduced when the gassing voltage is reached. The first part of this cycle is under the direct control of the output of the comparator C:2.35v which is applied via resistor 34 and capacitor 108 to the input of the amplifier AMP so that only the transition to the gassing voltage is applied as a reset signal by the action of the amplifier and the associated inverter 406/5 to the element CSC so that the counter is reset to start counting a 6 minute period charge from the transition. The transistion of the output of the comparator is also applied via inverter 406/1 and capacitor 111 and suppression circuit S to input 13 of a flip-flop FF TRANS. The input 13 is the "clear" input of this flip-flop which flip-flop controls the next part of the transition from the bulk charge to the gas charge phase. The output 8 of FF TRANS has remained at 1 after being set by the output of C:1.5v via "preset" input 10 when $V_c$ is below this value and now changes to 0. Having been reset the counter of element CSC will count the 6 minute period and count 10000000 will turn off the charging current. At count 10000001 the mono-stable MS will be operated. The output of this mono-stable besides being applied to gate 403/1 as mentioned above is applied through a suppression circuit S to "clock" terminal 11 of the flip-flop FF TRANS. An input applied to terminal 11 would not have had any effect on the flip-flop before the transition applied to "clear" terminal 13 which has the effect of priming the flip-flop. It will be seen that the operation of mono-stable MS at count 10000001 has two effects. Firstly the gate 403/1 is enabled to operate relay driver RD as described above so that capacitor C is charged to the then-existing value of voltage $V_c$. In this way if there has been any step backset in the value of voltage $V_c$ the charge on capacitor C will be adjusted so that subsequent sensing cycles will not operate on the basis of an anomalous starting point. Secondly the transition of the output of terminal 8 from 0-1 in response to the signal on terminal 11 of FF TRANS is applied through the resistor 41 and capacitor 110 to the input of the amplifier AMP to simulate an input to the amplifier sufficient to cause a reset pulse to be applied to gate 408/2. The counter in CSC is reset to zero and a 6 minute charging period commenced. At the end of this period the mono-stable MS is operated as previously described to cause capacitor C to be charged to the increased value of $V_c$ which increase, if sufficiently large, will cause a further resetting pulse and a continuation of the charge under the gassing charge control condition. When the increase of voltage $V_c$ is no longer sufficient to cause the resetting pulse the hold ready phase will be commenced as previously described.

The above operations have been described on the assumption that a battery in a reasonably good condition has been connected to the charger. If however a battery which has been discharged to an extremely low level is connected to the charger various anomalous conditions can occur. In particular the increase in the value of $V_c$ between two sensing periods may be too small to generate a resetting pulse for the counter of the element CSC. This can result in the commencement of a hold ready phase when the battery has received hardly any charge and is still almost completely discharged. Such a situation is most undesirable. To prevent this on the assumption that such a greatly discharged battery will have not yet reached the condition in which $V_c$ exceeds 2.22v per cell the circuits arranged that it is impossible to initiate a hold ready phase below this value. Furthermore a special cycle of operations is brought into effect if an attempt is made to initiate the hold ready phase below this value.

The arrangements for this cycle are as follows. In the absence of a suitable signal from comparator C:2.22v gate 403/3 is not in a suitable condition to initiate a hold ready phase when a count of 10000010 is reached as is described above. The counter continues to run although the charger will already have been turned off when the output of terminal $2^7$ changed to the binary 1 condition. Thus a further period of approximately six minutes is timed by the counter during which no charge is supplied. However during this time the binary 1 condition on terminal $2^7$ of element CSC will have maintained one input of 400/3 enabled so that every time a binary 1 appears on terminal $2^0$ of element CSC the mono-stable MS will be operated and, the battery voltage being above 1.5 volts the capacitor C will be connected to the battery by the action of relay driver RD and the relay RL through contact RL/1 as described above. In this way the voltage on the capacitor C is kept in step with changes in battery voltage resulting from charge received during initial charging period. After this period the battery is thus allowed a period of some 6 minutes to recover and reach a cell voltage which is more accurately representative of its state of charge.

When the counter of element CSC reaches the condition in which all the output terminals are binary 1 the next clock pulse causes the counter to reset and charger current is again allowed to flow on the removal of the disabling input to gate 408/1 derived from the output of inverter 406/3 as described above. At the end of the 6 minute charging period thus started the relay RL is operated via the mono-stable MS again as described above to sense the battery voltage with a view to resetting the counter of element CSC a very suitable increase in battery voltage has occurred. If the 6-minute interval resulting from the detection of what may be called a "pseudo-hold-ready" condition has been effective there will be a sufficient increase in battery voltage $V_c$ during this 6 minute charge to reset the counter and continue with the bulk charge phase until the proper hold-ready condition is detected again as described above.

If such a situation is not reached then the reaction of the control circuit to the "pseudo-hold-ready" condition is repeated until a resetting signal is detected and the bulk phase started.

The above description related to a battery in reasonable condition which has not been subjected to incorrect use. However the described reaction of the control circuit to an excessively discharged battery will ensure that almost any incorrectly used battery, when connected to the charger, will not be further ill-used by the wrong charging treatment. If the battery is almost fully charged on connection the rapid rise of voltage to "gassing" level will bring in the reduced rate of current and a stabilisation of voltage will result in the "hold ready" phase starting. This will happen in 2 or 3 cycles, c.12 or 18 minutes, and no harm will be caused to the battery. If the wrong voltage of battery is connected, e.g. producing a $V_c$ of less than 1.5v/cell of the correct battery no charge will start as no comparator will operate. Similarly if $V_c$ is more than 2.85v/cell for any reason the charger cannot supply current, inverter 406/4 applying the output of comparator C:2.85v to gate 408/1 to this effect. When a battery is removed from the charger the output voltage will rise above 2.85v/cell and turn off the charger. Once 2.85v/cell has been reached the charge must be restarted by reconnecting a battery as the comparator includes a latch.

FIG. 8 shows the circuit in more detail. The various integrated circuits and other components are indicated by the references of FIG. 7. Suitable types will be apparent to those skilled in the art, for example, the 72N and 74N series for the integrated circuits.

An important feature of the invention is however the design of the relay/capacitor combination used for sampling the battery voltage, items RL and C. Clearly the capacitor C must be of high quality giving a stable value and low leakage and the relay contact RL/1 must have a low leakage, at least $10^{12}$ ohm. Nonetheless given such a capacitor it has been found that a much improved performance is obtained if the capacitor and relay contact RL/1 are encapsulated so that the terminal at which they are joined (X in FIG. 1) is enclosed in the encapsulation. To this end the relay contact RL/1 is a glass-jacketed reed contact enclosed with the capacitor C in a suitable encapsulating or "potting" material to form a two-terminal device, avoiding leakage from point X. The relay coil RL surrounds the encapsulation in the usual manner.

By this construction the value of capacitor C can be kept to a low value, e.g. 4.7 microfarad with consequent cost and space savings. Although surface leakage across the encapsulation will still occur this will not affect the charge on the capacitor as the junction with the relay contact is protected.

Other details of the circuit including suppression networks S will be apparent from FIG. 8. For example it will be seen that when the control circuit is switched on without a battery connected the output of C:1.5v representing a value of $V_c$ below 1.5v sets FF HR and FF TRANS to their correct initial states and operates relay driver RD to close contact RL/1 and discharge capacitor C through the circuit deriving $V_c$ from the battery charging supply. This output via gate 408/2 also keeps the counter of CSC reset to zero.

The control circuits are described above with reference to a specific form of battery charging current source but are suitable for use with other forms of charger with modifications if needed as will be apparent to those skilled in the art. The embodiments described above are not the only manner in which the state of charge of the battery may be assessed having regard to the battery voltage on the occurrence of an interruption and other circuits and arrangements by which the invention can be applied will be apparent to those skilled in the art. Furthermore the specific circuit arrangements and timing cycles described are in no way a limitation of the invention.

We claim:

1. A battery charging control circuit in which the state of battery charge is assessed by measurement when the battery charging current is interrupted and including means operative during an interruption to time a period of time, means responsive to the end of said period to register the battery voltage, means to compare the registered battery voltage with the battery voltage registered earlier during an interruption of charging current and means responsive to the result of said comparison to control the charging current thereafter applied to the connected battery.

2. A control circuit as claimed in claim 1 including a sequence controller having a counter, a source of clock pulses and gates responsive to distinct states of the counter on counting the clock pulses to generate timing signals for the progress of the charge of the battery, including the duration and spacing of pulses of battery charging current.

3. A control circuit as claimed in claim 2 in which the source of clock pulses has different rates for different states of battery charge.

4. A control circuit as claimed in claim 2 in which the period of time is the time between a timing signal on the interruption of the charging current and a second, later, timing signal.

5. A control circuit as claimed in claim 1 in which the battery voltage is registered in analogue form as the charge stored on a capacitor supplied with battery voltage.

6. A control circuit as claimed in claim 5 in which the capacitor is charged during an interval beginning with the end of the period of time.

7. A control circuit as claimed in claim 6 in which the comparison between registered battery voltages is by a sensing means responsive to energy flow to or from the storage capacitor during said interval.

8. A control circuit as claimed in claim 4 in which the battery voltage is registered as a digital signal derived from the frequency of a voltage controlled oscillator controlled by the battery voltage.

9. A control circuit as claimed in claim 8 in which an interval is timed from the end of said period by a further timing signal and a change in battery voltage over the interval is recorded as a count in a counter counted in opposite directions for equal durations of time at the beginning and end of said interval by the output of the voltage controlled oscillator.

10. A control circuit as claimed in claim 9 in which the means to compare the registered battery voltage with the battery voltage registered earlier is responsive to the difference in the change of battery voltage during similar said intervals in similar said interruptions in the charging current.

11. A control circuit as claimed in claim 1 in which the means responsive to the result of the comparison is operative to modify the charging current when a change in registered battery voltage in successive measurements passes a threshold value and in which the modification is the supply of a timed pulse of battery charging current and thereafter interrupting the charging current until the battery voltage is measured as having fallen below a chosen value.

12. A control circuit as claimed in claim 11 in which the threshold represents the attainment by a battery being charged of the fully charged condition.

13. A battery charger including a battery charging control circuit as claimed in claim 1 and in which charger the charging current is controlled by means responsive to the magnitude of the battery voltage to generate a control signal representing a charging current in accordance with a predetermined relationship and in which the charger is adapted to a relationship appropriate to a battery to be charged by modifying an electrical circuit element of the means to generate a control signal.

14. A battery charger as claimed in claim 13 operative in an initial charging stage to supply a constant current of up to one-third of the ampere hour capacity of the battery until a sensor in the charger indicates that a gassing condition would have been achieved and in which the charging of the battery is thereafter controlled by the control circuit.

15. A battery charger as claimed in claim 13 for connection to an a.c. supply and including a rectifier and a choke and a semiconductor controlled rectifier in a charging current path and means to vary the firing angle of the semiconductor controlled rectifier to control the charging current in accordance with the state of charge of the battery assessed by the control circuit.

16. A battery charger as claimed in claim 15 in which the means to vary the firing angle is responsive to means responsive to the connection of a battery to the charger to delay the application of current to the battery for a period of time.

17. A battery charger as claimed in claim 15 in which the means to vary the firing angle is responsive to a sequence controler signal which indicates whether or not charging current is to be permitted.

* * * * *